United States Patent
Saga et al.

(10) Patent No.: US 11,262,917 B2
(45) Date of Patent: Mar. 1, 2022

(54) STORAGE SYSTEM AND SSD SWAPPING METHOD OF STORAGE SYSTEM

(71) Applicant: HITACHI, LTD., Tokyo (JP)

(72) Inventors: Tamami Saga, Tokyo (JP); Yuma Tanahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/000,401

(22) Filed: Aug. 24, 2020

(65) Prior Publication Data
US 2021/0303175 A1    Sep. 30, 2021

(30) Foreign Application Priority Data
Mar. 24, 2020 (JP) .............................. JP2020-052557

(51) Int. Cl.
*G06F 3/06* (2006.01)
(52) U.S. Cl.
CPC .......... *G06F 3/0616* (2013.01); *G06F 3/0631* (2013.01); *G06F 3/0665* (2013.01); *G06F 3/0679* (2013.01)
(58) Field of Classification Search
CPC .... G06F 3/0616; G06F 3/0631; G06F 3/0665; G06F 3/0679
USPC ....................................................... 711/103
See application file for complete search history.

(56) References Cited

U.S. PATENT DOCUMENTS

| | | | |
|---|---|---|---|
| 8,010,738 B1* | 8/2011 | Chilton ................ | G11C 16/349 711/103 |
| 2010/0005228 A1* | 1/2010 | Fukutomi ............. | G06F 11/108 711/103 |
| 2014/0281168 A1* | 9/2014 | Koseki .................. | G06F 3/0689 711/103 |
| 2015/0149705 A1 | 5/2015 | Nito | |
| 2017/0003891 A1* | 1/2017 | Arai ...................... | G06F 3/0644 |

FOREIGN PATENT DOCUMENTS

| WO | 2013/175540 A1 | 11/2013 |
|---|---|---|
| WO | 2016/046977 A1 | 3/2016 |

OTHER PUBLICATIONS

Japanese Office Action dated Oct. 19, 2021 for Japanese Patent Application No. 2020-052557.

* cited by examiner

*Primary Examiner* — Than Nguyen
(74) *Attorney, Agent, or Firm* — Volpe Koenig

(57) ABSTRACT

Provided is a storage system having a management server, a drive box including a plurality of SSDs, and a controller which performs control of receiving an I/O request from a host computer and reading data from or writing data in the SSD in the drive box. The management server selects the SSD to be swapped on the basis of a lifetime at a swapping time of the SSD in the drive box, and the controller controls a writing frequency for the selected SSD so that the selected SSD is controlled to reach the end of the lifetime at the swapping time.

9 Claims, 28 Drawing Sheets

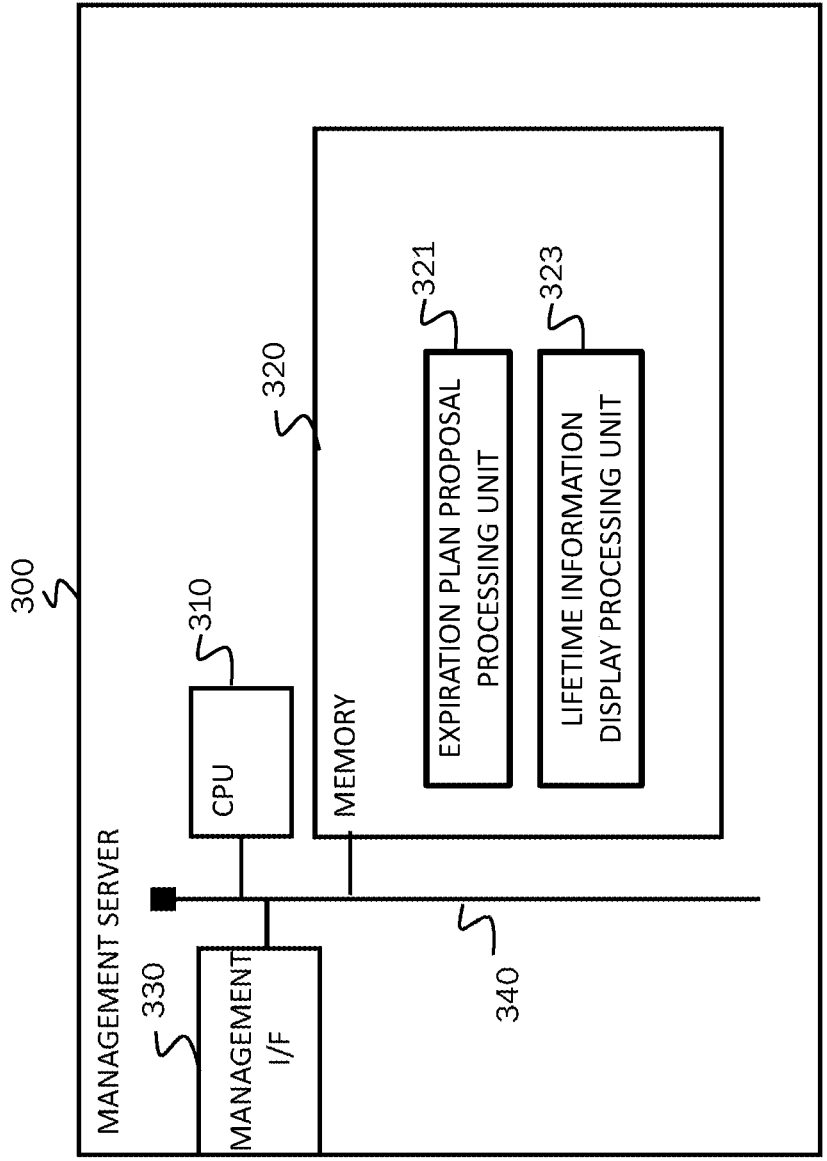

FIG. 4

USER POLICY TABLE 101a

| | |
|---|---|
| LIFETIME ADJUSTMENT VALIDATION | ON |
| DESIRED SWAPPING PERIOD | 20/06/01-20/06/30, 21/06/01-21/06/30, ... |
| CONSUMPTION SSD PRIORITIZED POLICY | PERFORMANCE PRIORITIZED |
| CONSUMPTION SSD PRIORITIZED POLICY EMPHASIS RATE | 0.5 |
| REARRANGEMENT EXECUTION CYCLE | 7 days |
| WRITING FREQUENCY CALCULATION UNIT TIME | 14 days |
| NUMBER OF DEVICES TO BE SWAPPED | 2 DEVICES |

FIG. 5

EACH-SSD EXPIRATION PLAN MANAGEMENT TABLE 101b

| PG NUMBER | 1 | 1 | 1 | 1 |
|---|---|---|---|---|
| SSD IDENTIFICATION NUMBER | 1 | 2 | 3 | 4 |
| NEXT EXPIRATION TARGET? | Yes | No | No | Yes |
| NEXT EXPIRATION TIME | 20/06/15 | 21/06/15 AND AFTER | 21/06/15 AND AFTER | 20/06/15 |
| EXCESSIVE LIFETIME ALERT | No | No | No | Yes |
| INSUFFICIENT LIFETIME ALERT | No | No | No | No |

FIG. 6

DYNAMIC MAPPING TABLE 101e

| VIRTUAL VOLUME PAGE IDENTIFICATION NUMBER | 1 | 2 | 3 |
|---|---|---|---|
| REAL PAGE IDENTIFICATION NUMBER | 1 | 5 | 8 |

FIG. 7

LOGICAL/PHYSICAL ADDRESS CONVERSION TABLE 101f

| REAL PAGE IDENTIFICATION NUMBER | 1 | 2 | 3 |
|---|---|---|---|
| PG IDENTIFICATION NUMBER | 1 | 1 | 6 |
| PHYSICAL DRIVE NUMBER:START ADDRESS NUMBER | 1:10,2:12, 3:22,4:95 | 4:14,10:91,5:64 ,8:44 | 12:59,14:9,15:2 2,9:10 |

FIG. 8

EACH-PAGE REARRANGEMENT MANAGEMENT TABLE 101d

| REAL PAGE IDENTIFICATION NUMBER | 1 | 5 | 8 | 10 |
|---|---|---|---|---|
| DESTINATION PG | 10 | 10 | 10 | 12 |
| DESTINATION DRIVE | 9,15,31,32 | 9,3,31,32 | 11,15,20,25 | 11,13,20,25 |

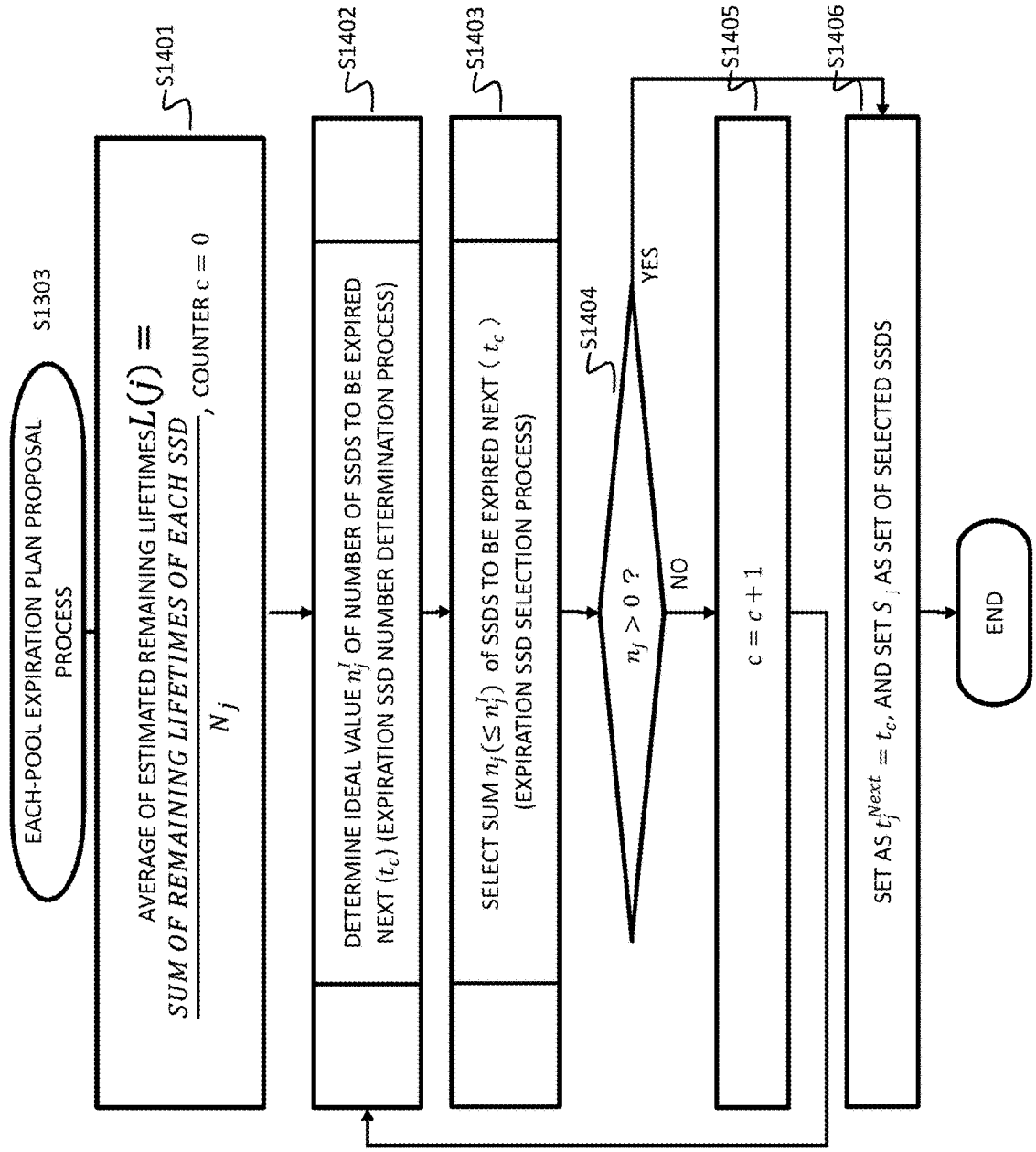

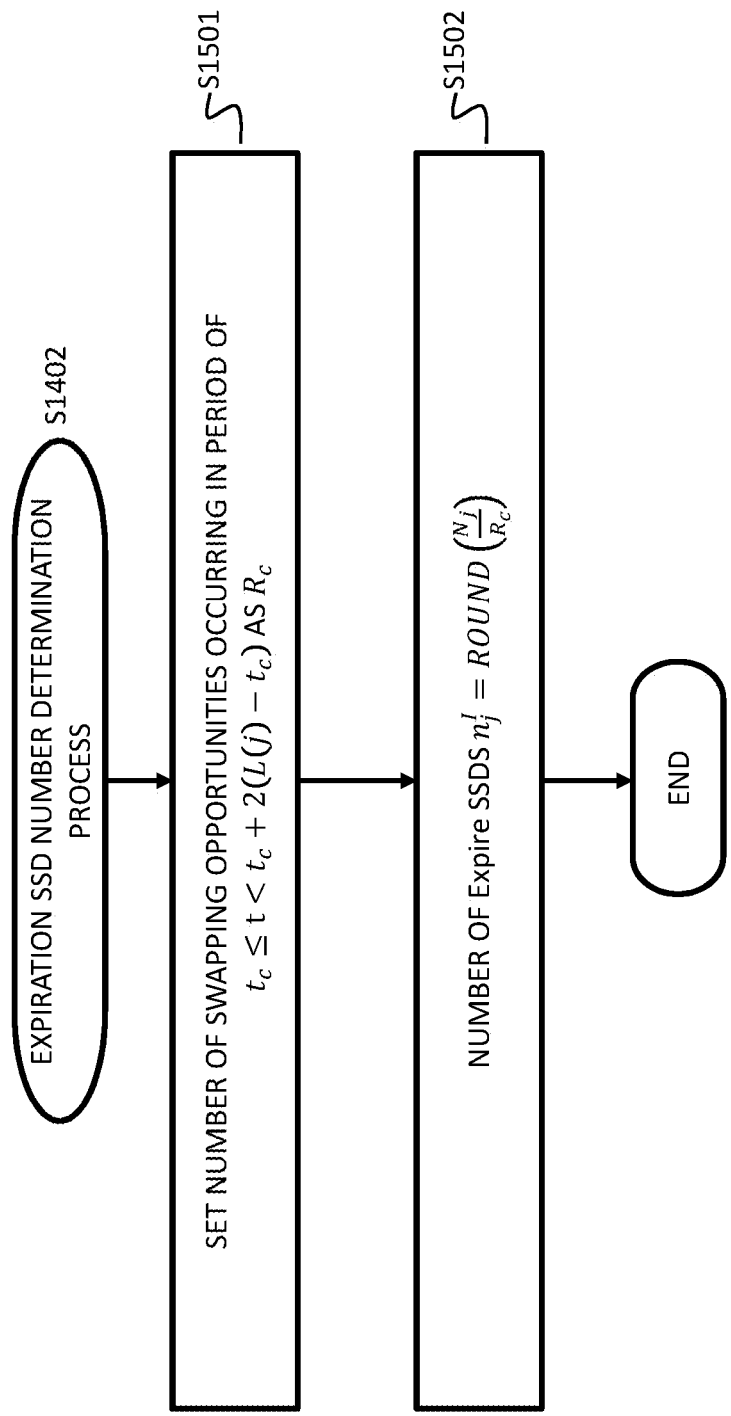

FIG. 16

DEFINITION OF TERMINOLOGY/VARIABLES

DEVICE ACQUISITION
CURRENT TIME : $t_{now}$
SUM of POOLS : $M$
WRITING FREQUENCY OF k-TH PAGE IN j-TH POOL : $f(k, j)$ [TIMES/MINUTE]
SUM OF SSDS IN j-TH POOL : $N_j$
NUMBER OF REMAINING WRITABLE TIMES OF i-TH SSD IN j-TH POOL : $v(i, j)$

| TERMINOLOGY/VARIABLES | DEFINITION |
|---|---|
| $t^{now}$ | CURRENT TIME |
| $t_c$ | REPRESENTATIVE TIME OF SWAPPING TIME CANDIDATE. AS CENTRAL TIME OF EACH CANDIDATE TIME DESIRED BY USER, AND SET $t_0$, $t_1$, ... AS TIME NEAR FROM CURRENT TIME |
| $t_j^{Next}$ | REPRESENTATIVE TIME OF NEXT SWAPPING TIME IN j-TH POOL |
| $n_j^I$ | IDEAL VALUE OF NUMBER OF SSDS TO BE EXPIRED NEXT IN j-TH POOL |
| $n_j$ | NUMBER OF SSDS TO BE EXPIRED NEXT IN j-TH POOL |
| $S_j = \{ s_{0,j}, \ldots s_{n_j-1, j} \}$ | SET OF SSDS TO BE EXPIRED NEXT IN j-TH POOL |
| $L(j)$ | AVERAGE OF ESTIMATED REMAINING LIFETIME OF EACH SSD IN j-TH POOL |
| $R_c$ | NUMBER OF SWAPPING OPPORTUNITIES OCCURRING FROM $t_c$ TO $t_c$ + $2(L(j) - t_c)$ |

FIG. 18

$$SCORE(S) = -a \sum_{i \in S} \left| \frac{v_{i,j}}{(t_c - t^{now})} - \overline{f_j} \right| + b \sum_{i \in S} p(i,j) \quad \cdots \text{FORMULA 1}$$

| TERMINOLOGY/VARIABLES | DEFINITION |
|---|---|
| $S$ | SET OF indexes OF SSDS ASSUMED TO BE EXPIRED |
| $a$ | WEIGHT COEFFICIENT RELATED TO LIFETIME OF SSD |
| $\frac{v_{i,j}}{(t_c - t^{now})}$ | IDEAL WRITING FREQUENCY of $i$-TH SSD |
| $\overline{f_j}$ | AVERAGE OF WRITING FREQUENCIES OF ENTIRE POOL $j$ |
| $b$ | WEIGHT COEFFICIENT RELATED TO SSD CHARACTERISTICS OF USER POLICY |
| $p(i,j)$ | PRIORITY BASED ON [CONSUMPTION SSD PRIORITIZED POLICY SELECTED BY USER] AND [TYPE OF $i$-TH SSD] |
| $v\_(i,j)$ | NUMBER OF REMAINING WRITABLE TIMES OF $i$-TH SSD IN $j$-TH POOL |

$p(i,j)$

| SSD TYPE | SLC | DLC | TLC | QLC |
|---|---|---|---|---|
| PERFORMANCE PRIORITIZED COEFFICIENT | 8 | 4 | 2 | 1 |
| COST PRIORITIZED COEFFICIENT | 1 | 1 | 1 | 1 |

STORAGE SYSTEM AND SSD SWAPPING METHOD OF STORAGE SYSTEM

BACKGROUND OF THE INVENTION

1. Field of the Invention

The present invention relates to a technique of creating a storage device (SSD) swapping plan in a storage system.

2. Description of the Related Art

In recent years, an all-flash storage device constructed by a solid state drive (SSD) in which a flash memory is mounted in a storage device has become widespread.

Unlike a hard disk drive (HDD), in the flash device, there is an upper limit on the number of times of writing which can be executed in the flash device physically. For this reason, in a storage system using a flash memory such as an SSD, management of rewriting lifetime is also important.

In the SSD, if writing to a specific portion of the flash memory is concentrated, that portion deteriorates fast as compared with the surroundings. For this reason, wear leveling is performed to level the number of times of writings in the entire flash device. Even in a storage system provided with a plurality of SSDs, a technique of leveling the number of times of rewritings among the SSDs has been proposed. For example, WO 2016/046977 A describes a technique of extending the lifetime of a storage system by adding an SSD having a required capacity.

In the above-mentioned WO 2016/046977 A, in a storage device in which a pool is configured by using a storage medium having a rewriting lifetime and provides a host with a logical volume having a virtual capacity, the storage device monitors whether or not a remaining rewriting lifetime of the capacity pool is insufficient in an operation period of the storage device, in a case where it is determined that the remaining rewriting lifetime is insufficient, the storage device converts a rewriting lifetime required to cover the insufficiency into a drive capacity and presents the drive capacity to request device maintenance. A technique of extending the lifetime by adding a capacity to a pool upon presentation is disclosed.

That is, in WO 2016/046977 A, assuming that the lifetime of the storage system is about five years, if the remaining rewriting lifetime of the pool is insufficient, the insufficient amount of the storage capacity is added, so that the lifetime of the storage device is up to five years that is the lifetime of the storage system.

On the other hand, there has been proposed a composable storage in which a controller that provides a function of a storage system and a drive box that provides a capacity can be separately added and removed. In the composable storage, it is conceivable that the drive box that has become independent of the functional lifetime of the controller has a longer swapping period, and the SSD in the drive box reaches the end of the lifetime before the swapping.

In such a system, the lifetime of the drive box needs to be managed separately from the lifetime of the controller. For example, the leveling of the lifetime of the entire drive box that is matched with the lifetime of the storage system such as five years as in WO 2016/046977 A is not enough. In other words, considering the business demands of the user, it is very important to allow the swapping timing to reach the user's desired time.

SUMMARY OF THE INVENTION

An object of the present invention is to provide a storage system and an SSD swapping method of a storage system, enabling addition or swapping of a necessary drive at a swapping time of the drive desired by a user.

In order to achieve the above object, according to one aspect of the present invention, there is provided a storage system having a management server, a drive box including a plurality of SSDs, and a controller which performs control of receiving an I/O request from a host computer and reading data from or writing data in the SSD in the drive box. The management server selects the SSD to be swapped on the basis of a lifetime at a swapping time of the SSD in the drive box, and the controller controls a writing frequency for the selected SSD so that the selected SSD is controlled to reach the end of the lifetime at the swapping time.

According to the present invention, by controlling the number of times of writing to the SSD, it is possible to control the lifetime of the SSD, and it is possible to enable addition or swapping of a necessary SSD at a swapping time desired by a user.

BRIEF DESCRIPTION OF THE DRAWINGS

FIG. 2A is a diagram illustrating an example of a configuration of a management server according to the embodiment;

FIG. 4 is a diagram showing an example of a user policy table according to the embodiment;

FIG. 5 is a diagram showing an example of an each-SSD expiration plan management table according to the embodiment;

FIG. 6 is a diagram showing an example of a dynamic mapping table according to the embodiment;

FIG. 7 is a diagram showing an example of a logical/physical address conversion table according to the embodiment;

FIG. 8 is a diagram showing an example of an each-page rearrangement management table according to the embodiment;

FIG. 14 is a flowchart illustrating in detail an example of the expiration plan proposal process according to the embodiment;

FIG. 15 is a flowchart illustrating details of an expiration SSD number determination process according to the embodiment;

FIG. 16 is a diagram illustrating information used in an each-pool expiration plan proposal process according to the embodiment and definitions for each term and variable;

FIG. 18 is a diagram illustrating an example of calculation of a score according to the embodiment;

DETAILED DESCRIPTION OF THE PREFERRED EMBODIMENTS

Figure 1:
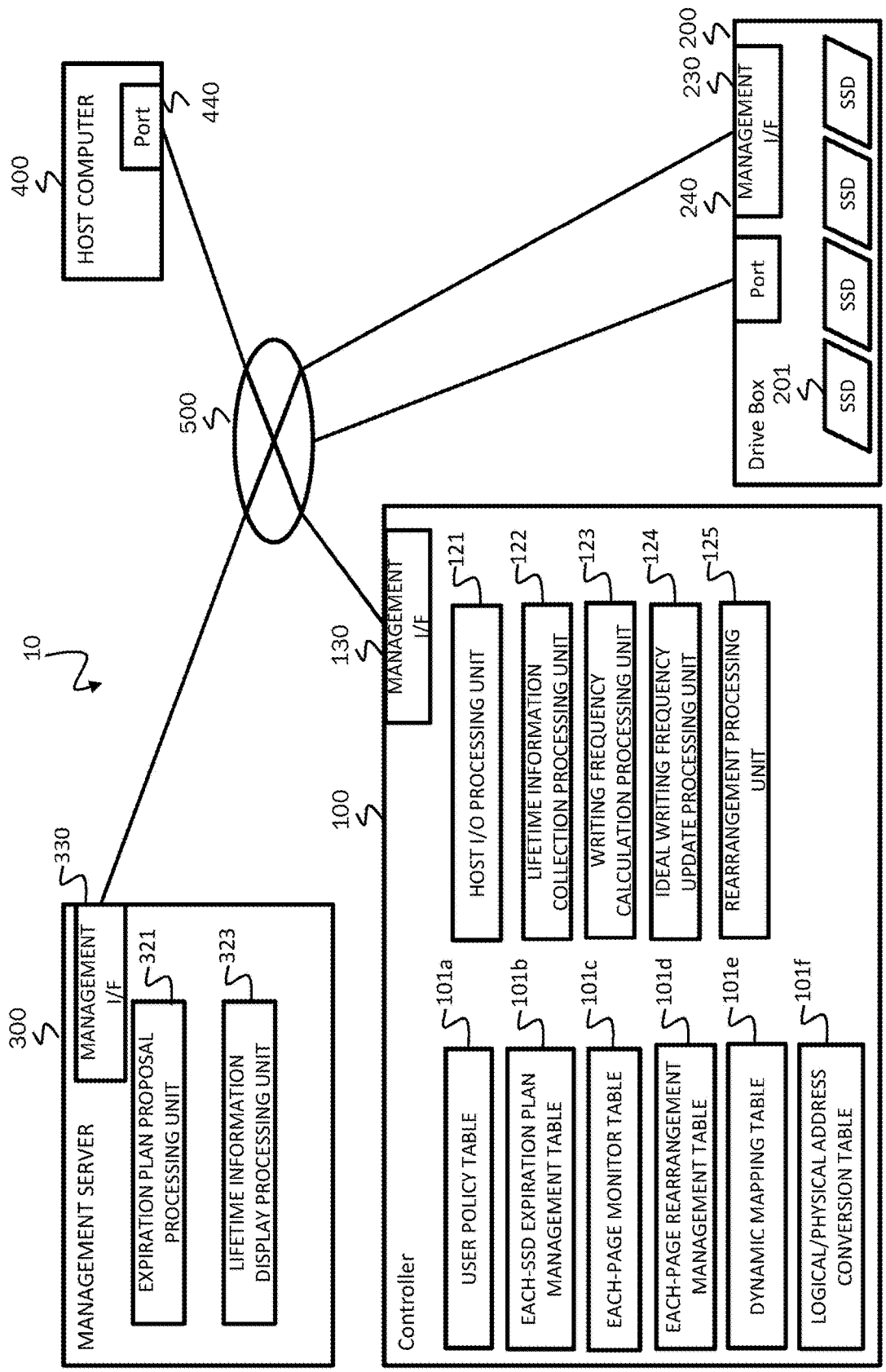
FIG. 1 is a diagram illustrating an example of a configuration of a computer system according to an embodiment.

Hereinafter, embodiments will be described with reference to the drawings. In addition, in the following description, various information may be described in the expressions such as "table", but the information may be expressed by a data structure other than the table. In addition, the "table" can be called "management information" in order to indicate that the information does not depend on the data structure.

In addition, a process with a "program" as the subject may be described. The program is executed by a processor that is a processing unit, for example, a micro processor (MP) or a central processing unit (CPU) and performs predetermined processing. Furthermore, since the processor performs processes while appropriately using a storage resource (for example, a memory) and a communication interface device (for example, a communication port), the subject of the processes may be the processor or the processing unit. The processor may have dedicated hardware in addition to the CPU. Computer programs may be installed on each computer from program sources. The program source may be, for example, provided by a program distribution server, a storage medium, or the like.

In addition, in the drawings and the description of the embodiment, the same portions are denoted by the same reference numerals, but the present invention is not limited to the embodiment, and all application examples that are matched with the idea of the present invention are included within the technical scope of the present invention. In addition, unless otherwise specified, each component may be plural or singular.

Embodiment

<System Configuration>

FIG. 1 is a diagram illustrating an example of a configuration of a computer system according to the embodiment.

The computer system 10 includes a host computer 400, a controller 100, a drive box 200, a management server 300, and a network 500.

The host computer 400 allows an operating system and an application operating on the operating system to operate and allows the controller 100 to issue I/O via the network 500.

The controller 100 is connected to the host computer 400 via the network 500. The network 500 is realized by a Fibre Channel or Ethernet (registered trademark) network or PCI-Express (registered trademark).

The controller 100 stores various management information of a user policy table 101a, an each-SSD expiration plan management table 101b, an each-page monitor table 101c, an each-page rearrangement management table 101d, a dynamic mapping table 101e, a logical/physical address conversion table 101f, and the like. In addition, the controller has a host I/O processing unit 121 for processing I/O from a host, a lifetime information collection processing unit 122, a writing frequency calculation processing unit 123, an ideal writing frequency update processing unit 124, and a rearrangement processing unit 125. The writing frequency calculation processing unit 123 and the ideal writing frequency update processing unit 124 may be integrated as the writing frequency calculation processing unit 123. Details of various management information and each processing unit will be described later.

The controller 100 is connected to the management server 300 via the network 500, and setting of the device and acquisition of information can be performed through the management server 300.

In addition, in a case where the controller is realized by a general-purpose server device, the host computer and the controller may be physically the same, and in that case, the network 500 may be omitted. In addition, the host computer may be realized by software like a virtual machine.

The management server 300 has a management interface 330 for transmitting and receiving commands or information for performing operation management of the controller 100 and the drive box 200, and has an expiration plan proposal processing unit 321 and a lifetime information display processing unit 323. Details of the expiration plan proposal processing unit 321 and the lifetime information display processing unit 323 will be described later.

The drive box 200 is connected to the controller 100 and the management server 300 via the network 500. The controller 100, the drive box 200, and the management server 300 constitute a storage system. The drive box 200 has a plurality of SSDs 201 that store a data, a port 240 that performs transmission/reception of an I/O data from the host computer 400, and a management interface 330 for transmitting/receiving management commands and the like from the management server 300. The drive box 200 may be provided inside the host computer 400.

Furthermore, in the embodiment, "expire" denotes that the SSD has reached the end of the lifetime of the SSD at the swapping time of the SSD, and depending on the context, the SSD to be expired can be understood as the SSD to be swapped.

FIG. 2A is a diagram illustrating an example of a configuration of the management server according to the embodiment.

Like a general computer, the management server 300 has a management interface 330, a memory 320, a CPU 310 that is a processing unit, and a connection device 340 such as a bus that connects the management interface 330, the memory 320, and the CPU 310.

The management interface 330 transmits and receives commands and information for performing operation management of the controller 100 and the drive box 200. The memory 320 has a region for temporarily storing programs constituting the expiration plan proposal processing unit 321 and the lifetime information display processing unit 323 and data. In FIG. 2A, the expiration plan proposal processing unit 321 and the lifetime information display processing unit 323 are described for easy understanding, but these units are realized by respective programs. The CPU 310 executes the programs stored in the memory 320 to realize respective functions of the expiration plan proposal processing unit 321, the lifetime information display processing unit 323, and the like.

Figure 2B:
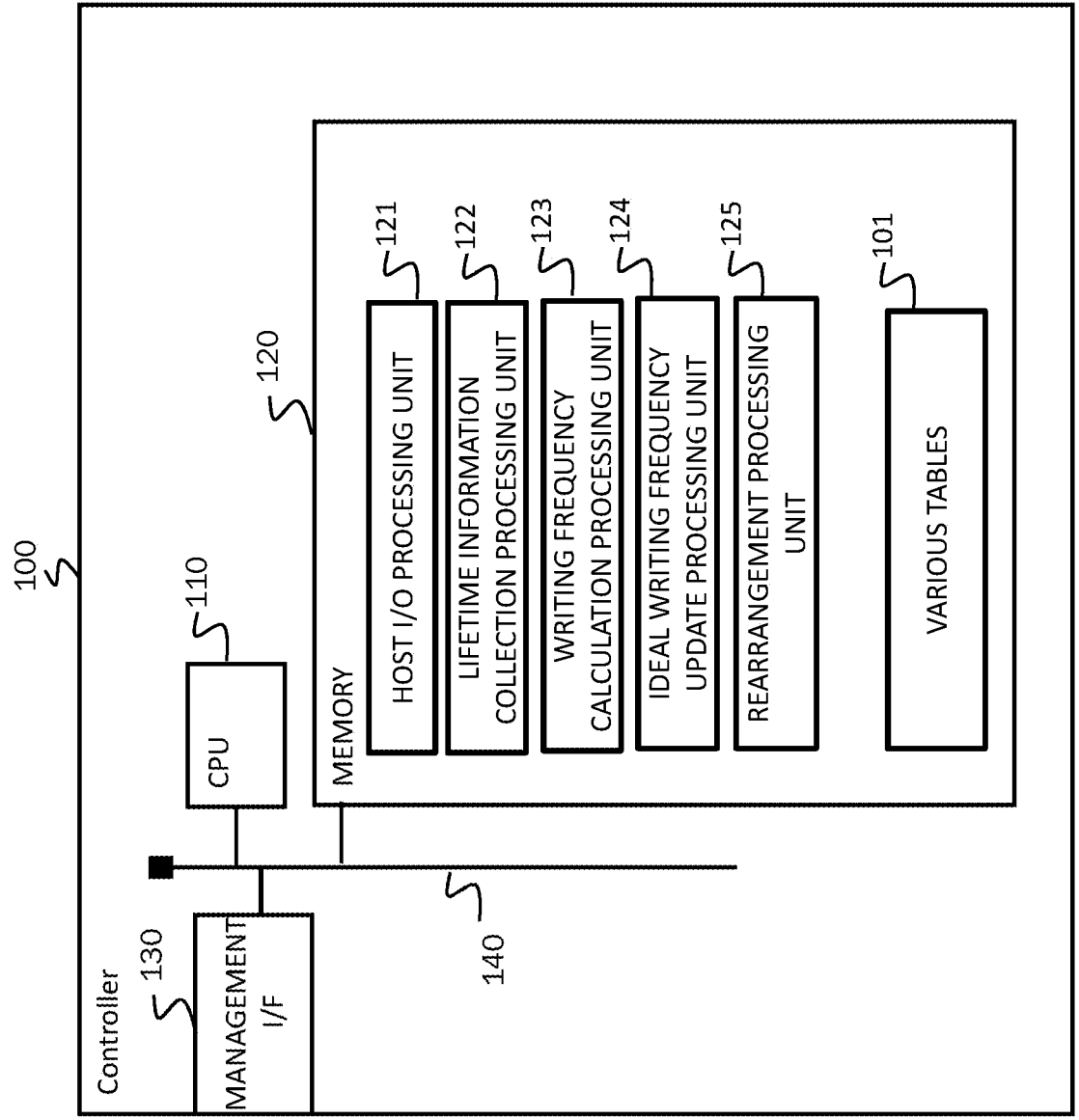
FIG. 2B is a diagram illustrating an example of a configuration of a controller according to the embodiment.

FIG. 2B is a diagram illustrating an example of a configuration of the controller according to the embodiment.

Like a general computer, the controller 100 has a management interface 130, a memory 120, a CPU 110 that is a processing unit, and a connection device 140 such as a bus that connects the management interface 130, the memory 120, and the CPU 110.

The management interface 130 is connected to the management server 300 and the drive box 200 and transmits and receives commands and the like for performing operation management. The memory 120 has an region for temporarily storing programs for configuring the host I/O processing unit 121, the lifetime information collection processing unit 122, the writing frequency calculation processing unit 123, the ideal writing frequency update processing unit 124, and the rearrangement processing unit 125, various management information 101 of a user policy table 101a, an each-SSD expiration plan management table 101b, an each-page monitor table 101c, an each-page rearrangement management table 101d, a logical/physical address conversion table 101f, and the like, and data. In FIG. 2B, the host I/O processing unit 121, the lifetime information collection processing unit 122, the writing frequency calculation processing unit 123, the ideal writing frequency update processing unit 124, and the rearrangement processing unit 125 are described for easy understanding, but these units are realized by respective programs. The CPU 110 executes the programs stored in the memory 120 to realize respective functions of the host I/O processing unit 121, the lifetime information collection processing unit 122, the writing frequency calculation processing unit 123, the ideal writing frequency update processing unit 124, the rearrangement processing unit 125, and the like.

Figure 3:
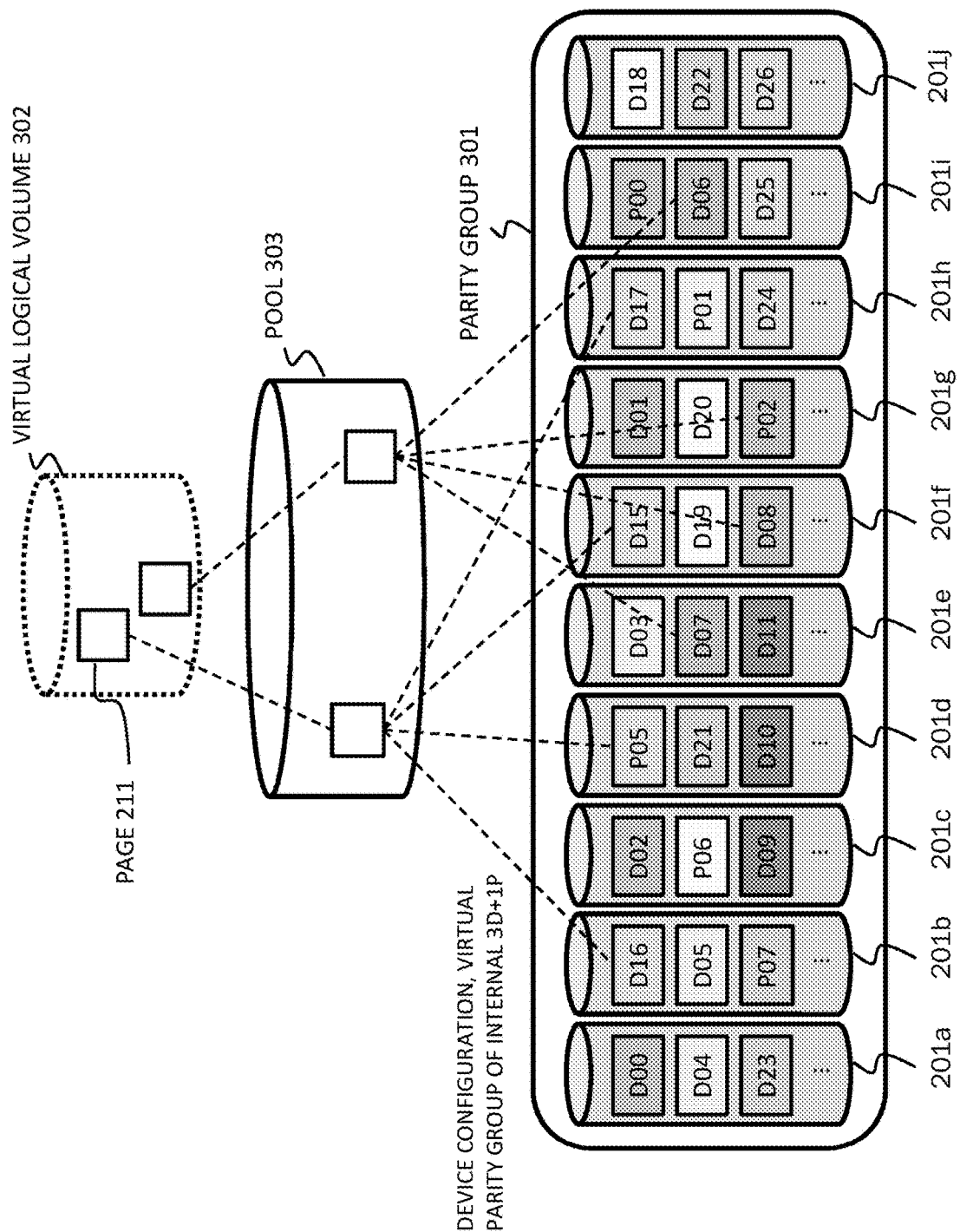
FIG. 3 is a diagram illustrating an example of an internal configuration of a pool managed by the controller according to the embodiment.

FIG. 3 is a diagram illustrating an example of an internal configuration of a pool managed by the controller 100 according to the embodiment.

In the embodiment, a technique of so-called thin provisioning is used in which the controller 100 provides a virtual logical volume 302 to the host computer 400 and allocates the actual capacity only to the accessed portion. The host computer 400 is accessed by using the virtual logical volume 302 provided by the controller 100. The virtual logical volume 302 is an empty volume having a virtual capacity. If data is written to the virtual logical volume 302 by the host computer 400, the controller 100 allocates entities from the pool 303 to an LBA region on the virtual logical volume in units of a page 211. More specifically, the controller 100 has page mapping information (dynamic mapping table) that manages the correspondence relationship between the LBA of the virtual logical volume 302 and the LBA of the capacity pool in units of a page and updates this information. The pool 303 is managed in units of a fixed length, for example, which are partitioned by several MBs called pages.

The pages of the pool 303 are, for example, configured with virtual parity groups such as D00, D01, D02, and P00. Each SSD is managed in units of a data having a predetermined capacity or a parity data.

In FIG. 3, similarly to a redundant arrays of inexpensive disks (RAID) technique, by using a data of ten devices of SSDs and a parity data, 3D+1P (3D is a data, and 1P is a parity data) is internally configured as a virtual parity group 301. For example, D00 of an SSD 201a, D02 of an SSD 201c, and D01 of an SSD 201g correspond to 3D, and P00 of an SSD 201i corresponds to corresponding 1P, and a parity group is formed by 3D+1P. In this manner, the pool 303 constitutes a virtual parity group 301 that can be extended in units of a drive by each data of ten SSDs and the parity data.

Furthermore, the pool 303 is, for example, managed by the host I/O processing unit 121 of the controller 100 on the basis of the information of the dynamic mapping table 101e and the logical/physical address conversion table 101f.

Although FIG. 3 illustrates an example in which one virtual parity group 301 and one pool 303 are allowed to correspond to each other, the correspondence relationship is not limited thereto, and for example, a plurality of virtual parity groups may be allowed to correspond to one pool 303.

In addition, the pages of the pool 303 may be, for example, configured in smaller units by striping D00, D01, D02, and P00.

<Various Management Information>

FIG. 4 is a diagram showing an example of the user policy table according to the embodiment.

The user policy table 101a is information for managing a user policy related to the swapping of the SSD and has items of lifetime adjustment validation, desired swapping period, consumption SSD prioritized policy, consumption SSD prioritized policy emphasis rate, rearrangement execution cycle, writing frequency calculation unit time, and the number of devices to be swapped.

The lifetime adjustment validation manages whether or not the lifetime adjustment of the SSD according to the embodiment is performed, the desired swapping period manages the swapping time of the SSD desired by the user, and the consumption SSD prioritized policy manages the characteristics of the SSD such as whether the SSD to be swapped is performance emphasized or price-oriented, respectively. In addition, the consumption SSD prioritized policy emphasis rate manages the degree of influence of the consumption SSD prioritized policy when determining the SSD to be swapped, the rearrangement execution cycle manages the cycle for executing the rearrangement of the data stored in the SSD page, and the writing frequency calculation unit time manages the writing frequency calculation interval, and the number of devices to be swapped manages the number of SSDs swapped per swapping. The information shown in FIG. 4 is input to the management server 300, processed by the expiration plan proposal processing unit 321, and stored as the user policy table 101a of the controller 100.

FIG. 5 is a diagram showing an example of the each-SSD expiration plan management table 101b according to the embodiment. The each-SSD expiration plan management table 101b is information for managing the expiration plan for each SSD, and manages each item of a PG number, an SSD identification number, a next expiration target, a next expiration time, an excessive lifetime alert, an insufficient lifetime alert, and the like.

The PG number is information for identifying the parity group constituting the pool 303, and the SSD identification number is information for identifying the SSD. In addition, the next expiration target indicates whether the SSD is the swapping target at the next SSD swapping time. The next expiration time indicates the aimed swapping time of the SSD.

The excessive lifetime alert indicates whether or not the lifetime remains at the next swapping time. The insufficient lifetime alert indicates whether the lifetime is insufficient at the next swapping time. In FIG. 5, it is shown that the SSD identification numbers "1" and "4" are swapping targets at the next swapping time, and the excessive lifetime alert of the SSD identification number "4" is "Yes".

Of the information shown in FIG. 5, the PG number, the SSD identification number, the next expiration target, and the next expiration time are input to the management server 300 and processed by the expiration plan proposal processing unit 321, and are stored as the each-SSD expiration plan management table 101b of the controller 100. The excessive lifetime alert and the insufficient lifetime alert are obtained by executing the expiration plan according to the embodiment.

FIG. 6 is a diagram showing an example of the dynamic mapping table 101e according to the embodiment. The dynamic mapping table 101e manages the correspondence between a virtual volume page identification number and a real page identification number. The dynamic mapping table shown in FIG. 6 indicates an example and may be in another form managed by a plurality of intermediate layers as long as the correspondence between the virtual volume page identification number and the real page identification number can be managed. The real page identification number is, for example, information for identifying the page region secured in the pool 303. In the case of rearranging the data between parity groups (PGs), the real page identification number, which is the information that identifies the page region that stores the data for the virtual page of the virtual volume, moves the entire page across the PGs so as to be rewritten to the number of the newly secured real page.

FIG. 7 is a diagram showing an example of the logical/physical address conversion table 101f according to the embodiment. The logical/physical address conversion table 101f manages the correspondence relationship between the real page, the parity group (PG) including the real page, and the address of the physical drive (SSD). The logical/physical address conversion table shown in FIG. 7 can be realized in other forms as long as the correspondence between the real page, the parity group (PG), and the address of the physical drive (SSD) is managed. In the case of rearranging data in the PG, only some data of the page is moved, and thus, for example, a portion of the address of the physical drive is rewritten.

The dynamic mapping table 101e of FIG. 6 and the logical/physical address conversion table 101f of FIG. 7 correspond to so-called configuration information, and the correspondence relationship between the pages of the virtual volume provided to the host computer 400 and the storage regions for the data of the SSD in the drive box can be managed.

In addition, by adding the information for identifying the drive box to the logical/physical address conversion table 101f in FIG. 7, it is possible to manage the SSD to be expired in units of a drive box.

FIG. 8 is a diagram showing an example of the each-page rearrangement management table 101d according to the embodiment.

The each-page rearrangement management table 101d manages the correspondence between the identification number of the real page, a destination PG, and a destination drive to rearrange the data stored in the real page to another SSD. For example, in FIG. 8, it is shown that the real page identification number "1" is rearranged to the destination PG "10" and the destination drives "9, 15, 31, and 32". The real page identification number stores information on a page for which a page rearrangement plan is set between the SSDs. The values of the each-page rearrangement management table 101d of FIG. 8 are stored in the each-page rearrangement management table 101d of the memory 120 when the controller 100 receives the expiration plan created by the expiration plan proposal processing unit 321 of the management server 300. Furthermore, the items shown in FIGS. 4 to 8 are merely examples, and each item can have other values.

<Outline of Process in the Embodiment>

Figure 9:
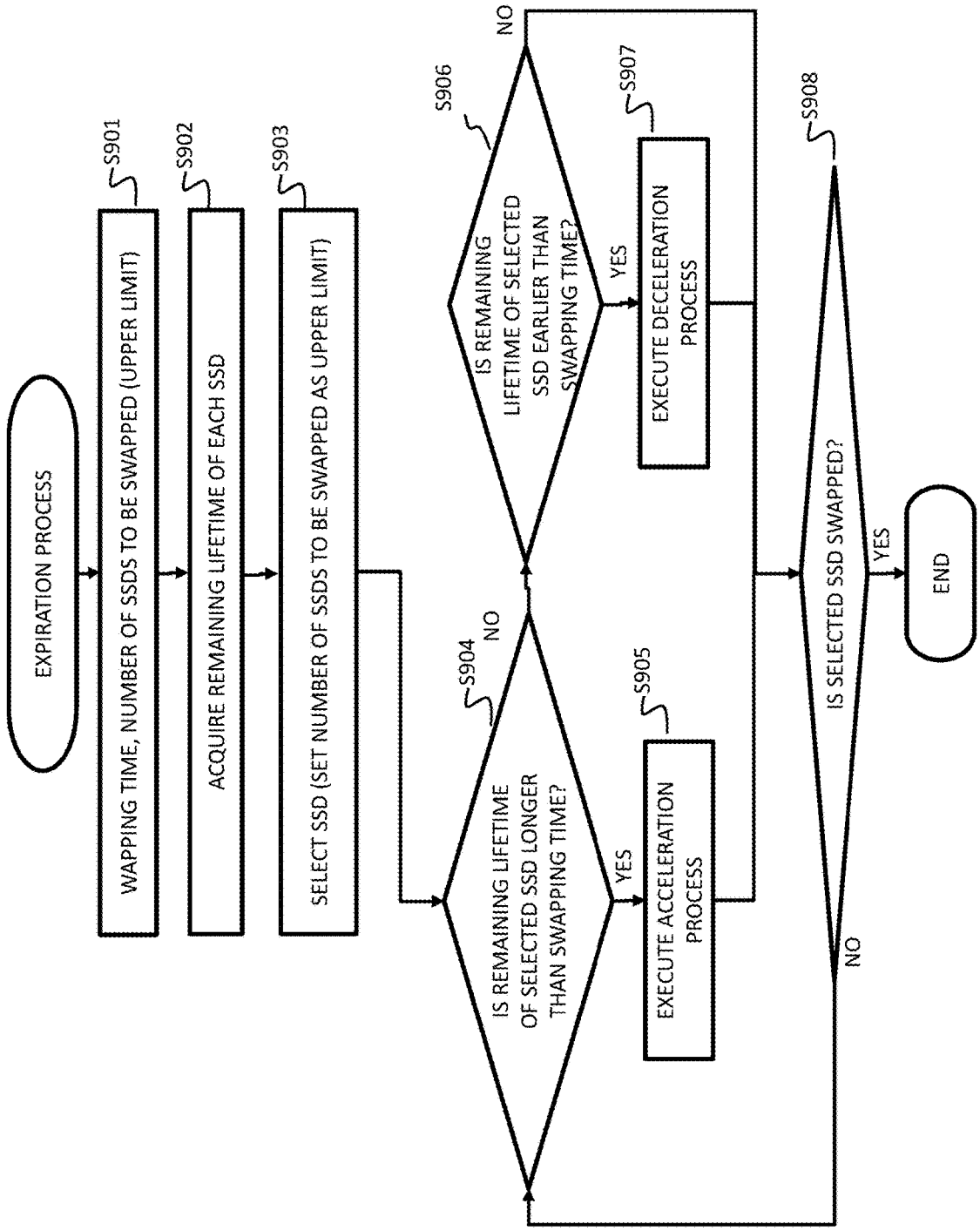
FIG. 9 is a flowchart illustrating an outline of an expiration process according to the embodiment.

FIG. 9 illustrates an outline of the expiration process processed by the management server 300 and the controller 100.

First, in step S901, a user inputs a swapping time of an SSD and the number of SSDs to be swapped at the swapping time from the management server 300. In step S901, only the swapping time of the SSD is input, and the number of SSDs to be swapped may be obtained by calculating the number of SSDs that can be controlled to reach the end of the lifetime at the swapping time.

Next, in step S902, the management server 300 acquires the remaining lifetime of each SSD from the drive box 200. The remaining lifetime can be acquired by using means of self-monitoring analysis and reporting technology (SMART), LOG SENSE command, or the like. The remaining lifetime of the SSD may be calculated on the basis of the writing frequency for each virtual volume page.

Next, in step S903, the management server 300 selects the SSD to be swapped at the swapping time input in step S901. As the SSD to be swapped, for example, an SSD having an insufficient remaining lifetime is selected. In addition, the selection can also be made according to the consumption SSD prioritized policy managed by the user policy table 101a.

Next, the management server 300 obtains the expiration time from the remaining lifetime of the SSD selected in step S903 and compares the expiration time with the swapping time input in step S901. In a case where the swapping time comes earlier than the expiration time of the SSD, the remaining lifetime of the selected SSD is long, and therefore, the acceleration process is executed by performing the data rearrangement so as to increase the number of times of writing to the selected SSD (S905). On the other hand, in a case where "NO" is indicated in step S904, it is determined whether the expiration time of the SSD comes earlier than the swapping time (S906). In a case where the expiration time of the SSD comes earlier than the swapping time ("YES" in step S906), the deceleration process is executed by performing the data rearrangement so as to decrease the number of times of writing to the selected SSD (S907). In a case where "NO" is indicated in step S906, normal processing is executed without executing the acceleration process or the deceleration process. Steps S905 and S907 are executed by the controller 100 on the basis of an operation command such as the expiration plan from the management server 300.

It is determined whether the selected SSD has been swapped (S908). If the selected SSD has not been swapped, the process returns to step S904, and the same processing is repeated. The determination of step S908 is executed, for example, at each predetermined period so that the selected SSD reaches the end of a lifetime at the swapping time. If the SSD is swapped, the process ends.

In this manner, by controlling the number of times of writing to the SSD, it is possible to control the lifetime of the SSD, and it is possible to enable addition or swapping of the SSD at the swapping time desired by the user or after the predetermined number of drives have been used up. Furthermore, in step S901, the number of drive boxes to be swapped may be input instead of the input number of SSDs to be swapped. In this case, in step S903, a drive box including an SSD having an insufficient lifetime is selected, and by referring to the dynamic mapping table 101e and the logical/physical address conversion table 101f, the acceleration process or the deceleration process of the writing frequency for the selected drive box is executed.

Figure 10:
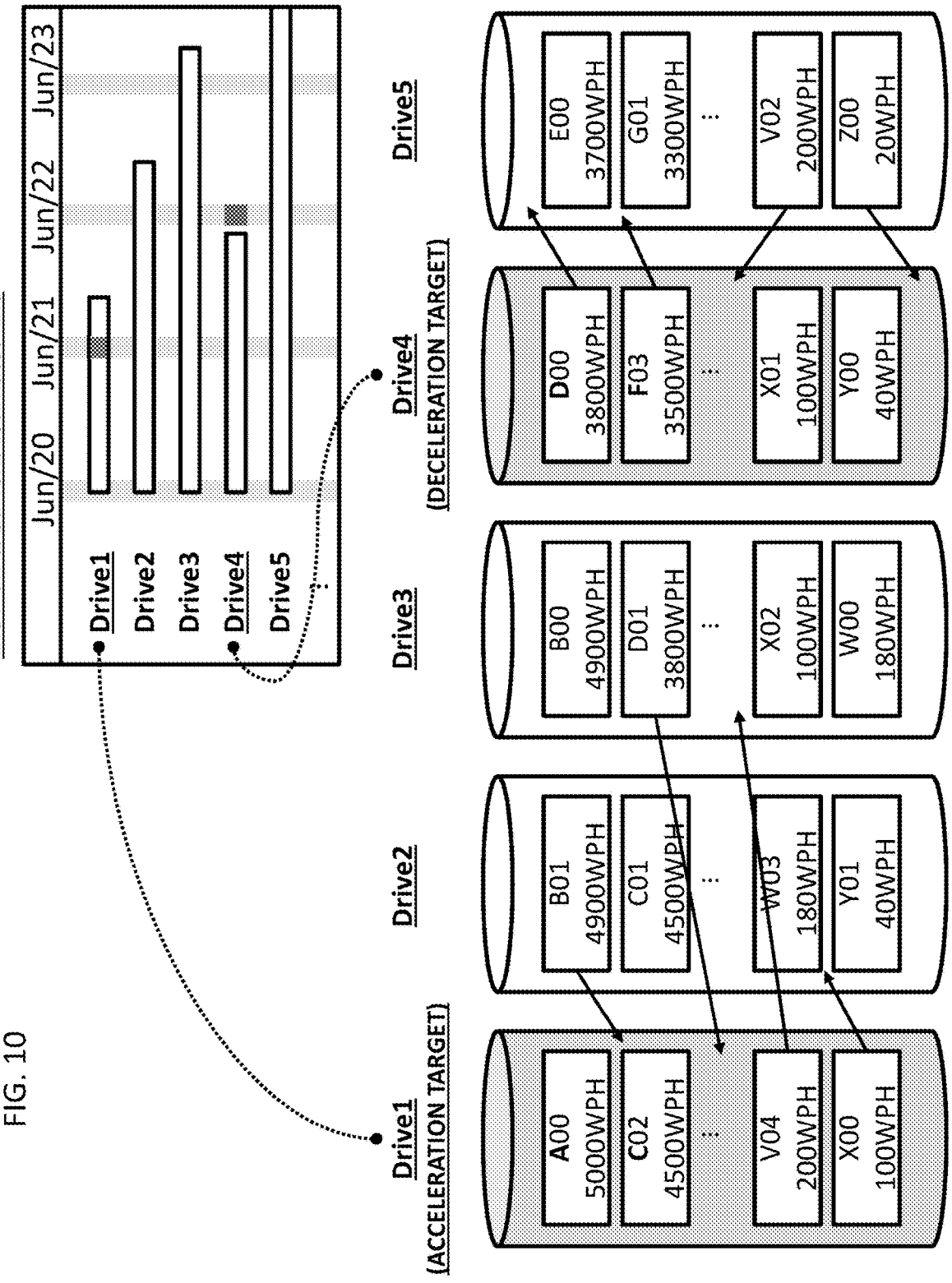
FIG. 10 is a diagram describing a concept of an acceleration process and a concept of a deceleration process according to the embodiment.

FIG. 10 is a diagram describing a concept of the acceleration process and a concept of the deceleration process according to the embodiment.

As a result of steps S904 and S906 in FIG. 9, it is assumed that the drive 1 that is an SSD is the target of the acceleration process, and the drive 4 is the target of the deceleration process. In this case, the drive 1 has a low writing frequency and a long lifetime. The drive 4 has a high writing frequency and an insufficient lifetime.

Therefore, for example, a data V04 of the drive 1 having a low writing frequency is rearranged to the drive 3. On the other hand, a data F03 of the drive 4 having a high writing frequency is rearranged to the drive 5. In FIG. 10, the writing frequency of the data stored in the data V04 of the drive 1 is "200 WPH", and the writing frequency of the data stored in the data F03 of the drive 4 is "3500 WPH". The arrows attached to the data of each drive indicate the location and direction of the data rearrangement.

Furthermore, the data writing frequency may be monitored on the page of the virtual logical volume 302. The lifetime of the SSD can also be obtained from the number of times of writing to the SSD and the writing frequency of the SSD for the real page corresponding to the page of the virtual logical volume 302 on the basis of the configuration information such as the dynamic mapping table 101e and the logical/physical address conversion table 101f.

Figure 12:
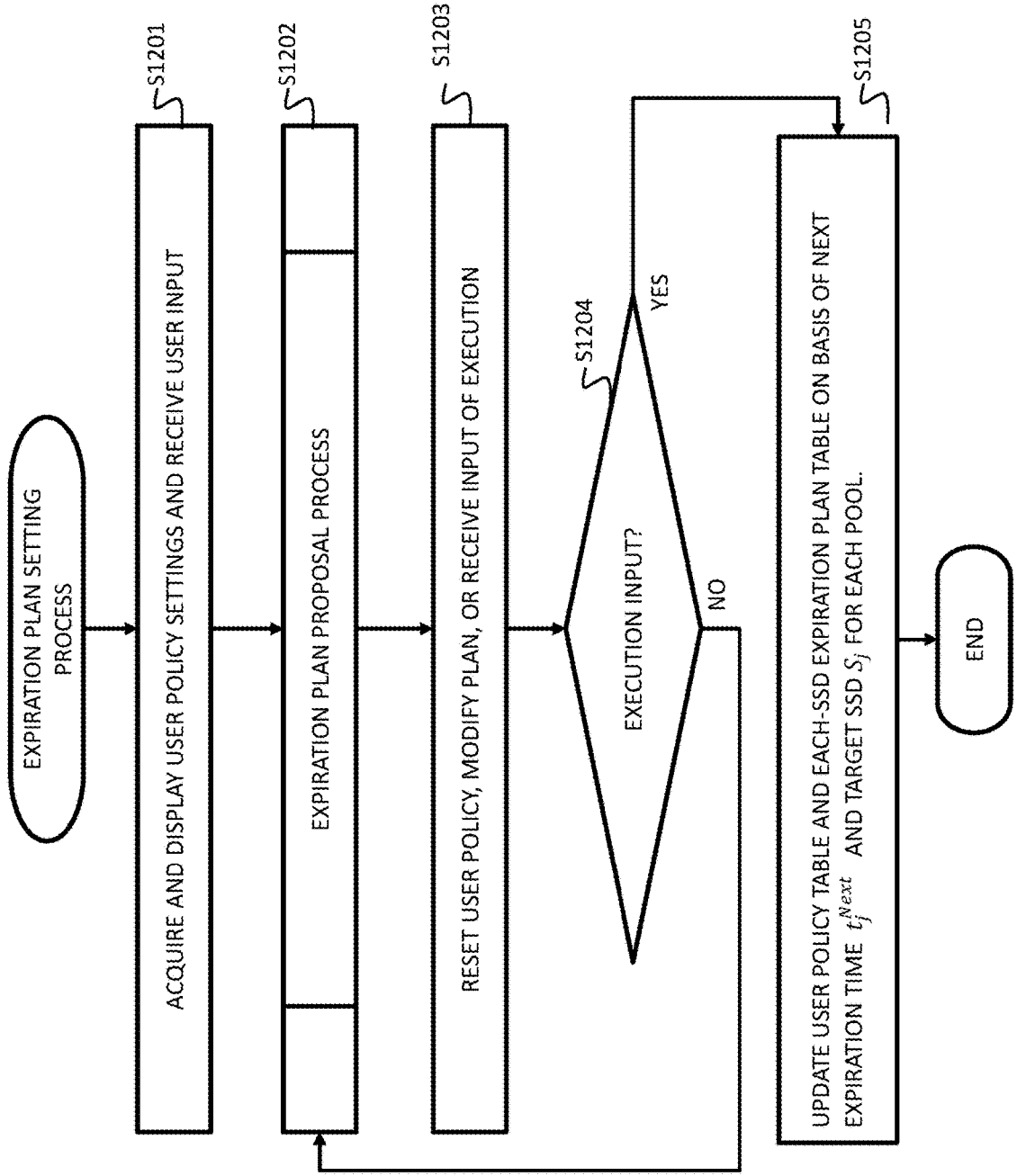
FIG. 12 is a flowchart illustrating an example of an expiration plan setting process according to the embodiment.

In addition, FIG. 9 illustrates the concept of the expiration process according to the embodiment in an easy-to-understand manner, and the details of the actual operation are illustrated in FIG. 12 and subsequent figures.

In this manner, by rearranging each data on the drive, for example, the acceleration process is executed for the drive 1 and the deceleration process is executed for the drive 4. As a result, by controlling the lifetime of the SSD, it is possible to match the lifetime of the SSD with the swapping time desired by the user.

<Setting Screen>

Figure 11:
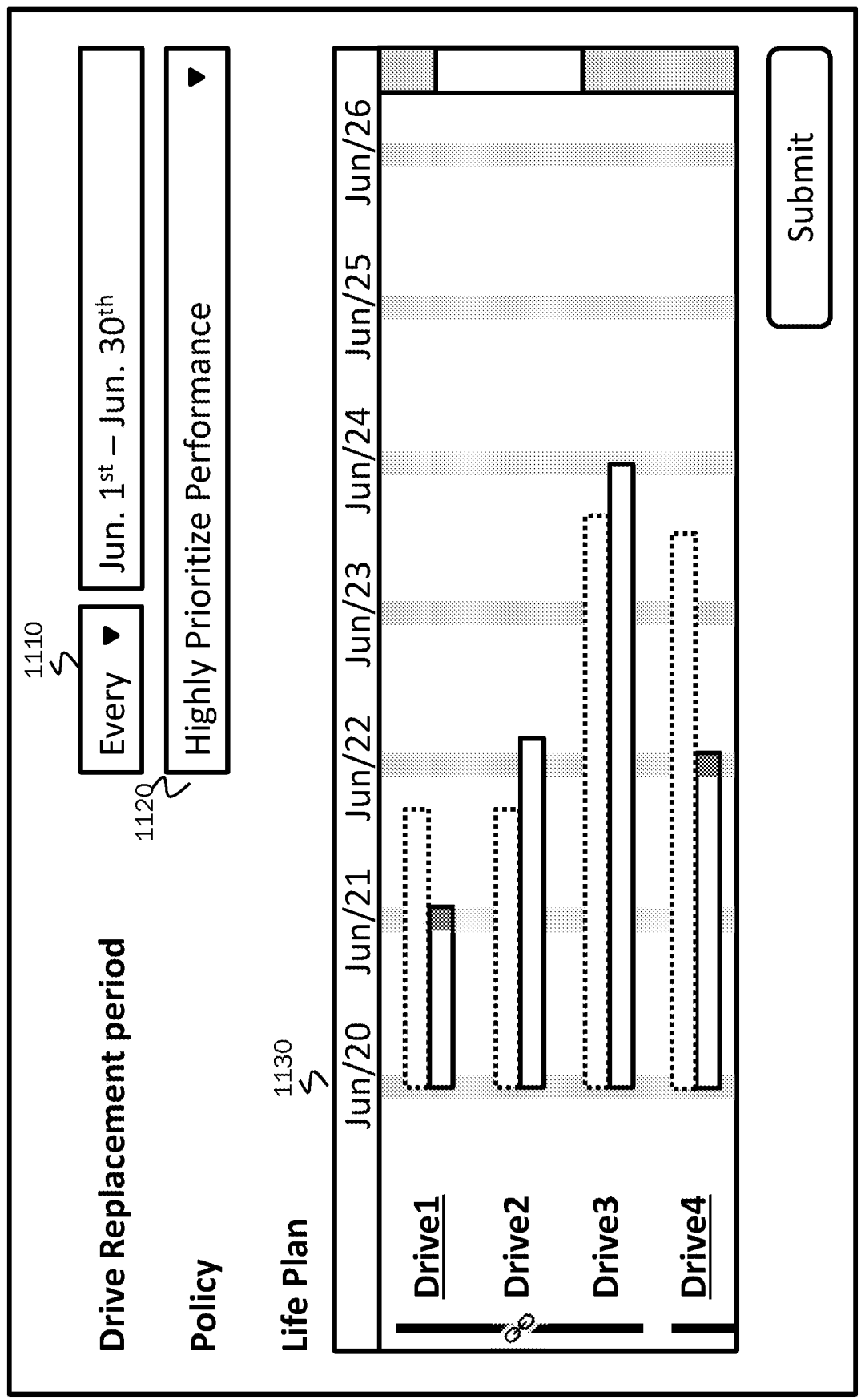
FIG. 11 is a diagram illustrating an example of a lifetime policy setting screen according to the embodiment.

FIG. 11 is a diagram illustrating an example of a lifetime policy setting screen according to the embodiment.

In FIG. 11, the lifetime policy setting screen according to the embodiment is displayed on a display unit (not illustrated) of the management server 300, and an administrator inputs a drive swapping time 1110 and a policy 1120, so that the lifetime of each drive is displayed as a life plan 1130 on the basis of the input result.

In the example of FIG. 11, June every year is input as the drive swapping time 1110, and high performance (performance prioritized) is input as the policy 1120. As a result, for example, it is indicated that, by performing the acceleration process on the drive 1, the lifetime of the drive 1 is shortened from the lifetime of a dotted line to the lifetime of a solid line. On the lifetime policy setting screen illustrated in FIG. 11, the swapping time of the SSD in step S901 in FIG. 9 and the number of SSDs to be swapped at the swapping time may be input. In addition, the next expiration target, the next expiration time, and the like of the user policy table 101a shown in FIG. 4 or the each-SSD expiration plan management table 101b shown in FIG. 5 may be input.

<Expiration Plan Setting Process>

FIG. 12 is a flowchart illustrating an example of an expiration plan setting process executed by the expiration plan proposal processing unit 321 of the management server 300.

In step S1201, the management server 300 acquires and displays the user policy settings from the lifetime policy setting screen of FIG. 11 and receives the user input. Herein, at least one of the desired swapping time of the SSD, the number of SSDs to be swapped, and the characteristics of the SSDs to be swapped is input in response to the user's request.

Figure 13:
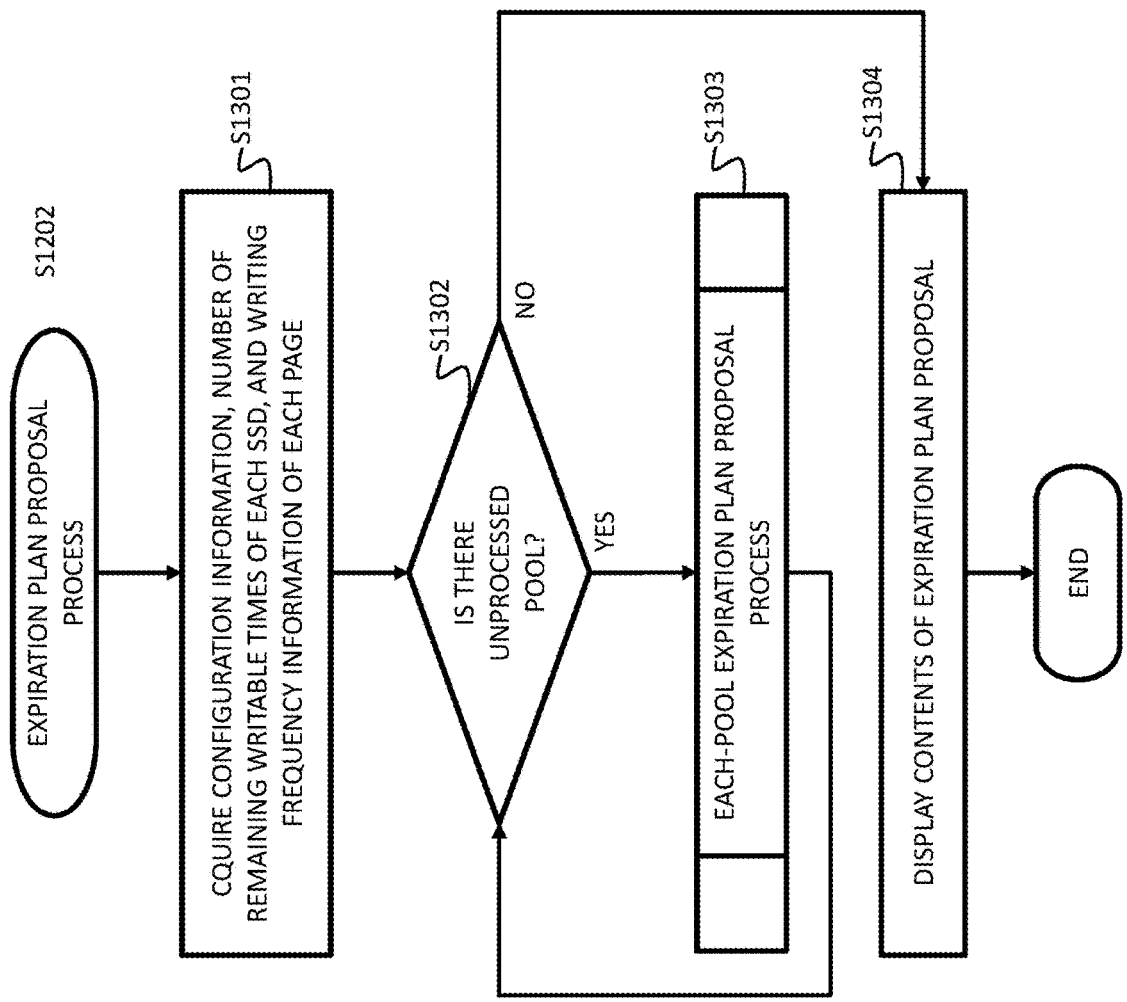
FIG. 13 is a flowchart illustrating an example of an expiration plan proposal process according to the embodiment.

Next, in step S1202, the expiration plan proposal processing unit 321 of the management server 300 executes the expiration plan proposal process. Details are illustrated in FIG. 13.

Next, in step S1203, input of user policy resetting, plan modification, or execution is received. This is to perform the modification of the expiration plan proposal made in S1202. For example, in a case where there is no SSD that will reach the end of the lifetime at the next swapping time, the swapping time or the like is modified.

In a case where the SSD that will reach the end of the lifetime cannot be selected at the swapping time input by the user, it is possible to propose the user to input another swapping time.

Furthermore, in a case where there is no modification of the expiration plan proposed in step S1202, this step is omitted.

Next, in step S1204, if a command to execute the proposed expiration plan is input, the process proceeds to step S1205, and if not input, the process returns to step S1202.

In step S1205, the user policy table (FIG. 4) and the each-SSD expiration plan management table (FIG. 5) are updated on the basis of the next expiration time and the target SSD for each Pool.

FIG. 13 is a flowchart illustrating an example of the expiration plan proposal process S1202 executed by the expiration plan proposal processing unit 321 of the management server 300.

In step S1301, the configuration information of the dynamic mapping table 101e, the logical/physical address conversion table 101f, and the like, the number of remaining writable times of each SSD, and the writing frequency information of each page of the virtual volume are acquired from the controller 100.

Next, in step S1302, it is determined whether there is an unprocessed pool 303. If there is the unprocessed pool, the process proceeds to step S1303, and if there is no unprocessed pool, the process proceeds to S1304 to display the content of the expiration plan proposal.

In step S1303, the each-pool expiration plan proposal process is performed. Details of the process are illustrated in FIG. 14.

In step S1304, the content of the expiration plan proposal is displayed on the display unit of the management server 300.

In FIG. 13, it is assumed that there are a plurality of pools, but in a case where the controller manages only one pool, the process of step S1302 may be omitted.

FIG. 14 is a flowchart illustrating details of the expiration plan proposal process S1303 executed by the expiration plan proposal processing unit 321 of the management server 300. Through this process, the SSD to be swapped at the next swapping time is selected.

FIG. 15 is a flowchart illustrating details of an expiration SSD number determination process (step S1402 of the expiration plan proposal process) executed by the expiration plan proposal processing unit 321 of the management server 300.

FIG. 16 illustrates information used in the processes illustrated in FIGS. 14 and 15.

In FIG. 16, the current time tnow and the total number M of pools are set as the information acquired from the management server 300.

In addition, as the information acquired from the controller, the writing frequency f(k,j) [times/minute] of the k-th page in the j-th pool, the total number Nj of SSDs in the j-th pool, and the number of remaining writable times v(i,j) of the i-th SSD in the j-th pool are set.

Hereinafter, tnow, $t_c$, and the like are used in the definitions as illustrated in FIG. 16. In the following description, the definitions are used for notation, but in some cases, some variables may be added in addition to the definitions.

Returning to FIG. 14, the description is continued. In step S1401, the average L(j) of the estimated remaining lifetime of the SSDs constituting the pool 303 is obtained. The counter c is a value for processing for each pool. Although the subscript j is illustrated in FIG. 14 to indicate the process for each pool, the process will be described below as a process for one pool for simplification of the description.

As illustrated in step S1401, the average L of the estimated remaining lifetime is obtained by dividing the sum of the remaining lifetimes of the SSDs included in the processing target pool by the number of SSDs (SSDs to be expired) to be swapped next in the target pool.

Furthermore, the average L of the estimated remaining lifetime may be calculated by dividing the sum of the numbers of remaining writable times of the SSDs included in the target pool by the sum of the writing frequencies for the pages or may be obtained by using the average of the remaining lifetimes received from the respective SSD drives.

In step S1402, an ideal value of the number of SSDs to be expired at the swapping time candidate ($t_c$) is determined. Details of this process will be described with reference to FIG. 15.

In step S1403, the sum ($n_j$) of SSDs to be expired at the next swapping time is selected. Details of this process will be described with reference to FIG. 17.

In step S1404, it is determined whether the sum ($n_j$) of SSDs to be expired at the next swapping time is larger than "0". If the sum is larger than 0, the process proceeds to step S1406.

In a case where the sum ($n_j$) of SSDs to be expired at the next swapping time is "0", the process proceeds to step S1405, and the process of the next pool is performed.

In step S1406, the swapping time candidate $t_c$ is set as the next swapping time, and the selected SSDs are allowed to become a set.

Furthermore, in the calculation of the average of the estimated remaining lifetime in step S1401, step S1402 can be omitted in a case where the user specifies the number of devices to be swapped in the expiration plan setting process.

In the embodiment, a writing process for the SSD is controlled so that the lifetime of the SSD to be swapped next will be the same as the swapping time of the SSD. Therefore, the SSD to be swapped is sometimes called an SSD to be expired. By controlling the writing process for the SSD, that is, controlling the writing frequency, some SSDs included in the drive box in the system can be systematically swapped, and thus, it is possible to reduce the system operation cost, and it is possible to swap only a predetermined number of the SSDs having certain characteristics at the user's desired swapping time.

FIG. 15 is a flowchart illustrating details of the expiration SSD number determination process (step S1402 of the expiration plan proposal process) executed by the expiration plan proposal processing unit 321 of the management server 300.

In step S1501, the number of swapping opportunities occurring in a predetermined period is set as $R_c$. The predetermined period is the period illustrated in step S1501 in FIG. 15 and is determined ideally in such a manner that all SSDs in the pool are swapped stepwise.

In step S1502, an ideal value of the number of SSDs to be expired is obtained from the number of SSDs to be expired next and the number of swapping opportunities $R_c$. That is, a value obtained by dividing the number of SSDs to be swapped by the number of swapping opportunities is set as an ideal number of devices to be swapped.

Furthermore, in a case where the ideal value of the number of SSDs to be expired is "0", the process may end with the number of SSDs to be expired being set to "1".

As described above, since the appropriate number of SSDs is swapped at the swapping time input by the user, the number of SSDs to be swapped can be proposed to the user.

In addition, in the expiration plan setting process, in a case where the number of devices to be swapped is specified by the user, the process illustrated in FIG. 15 can be omitted.

Figure 17:
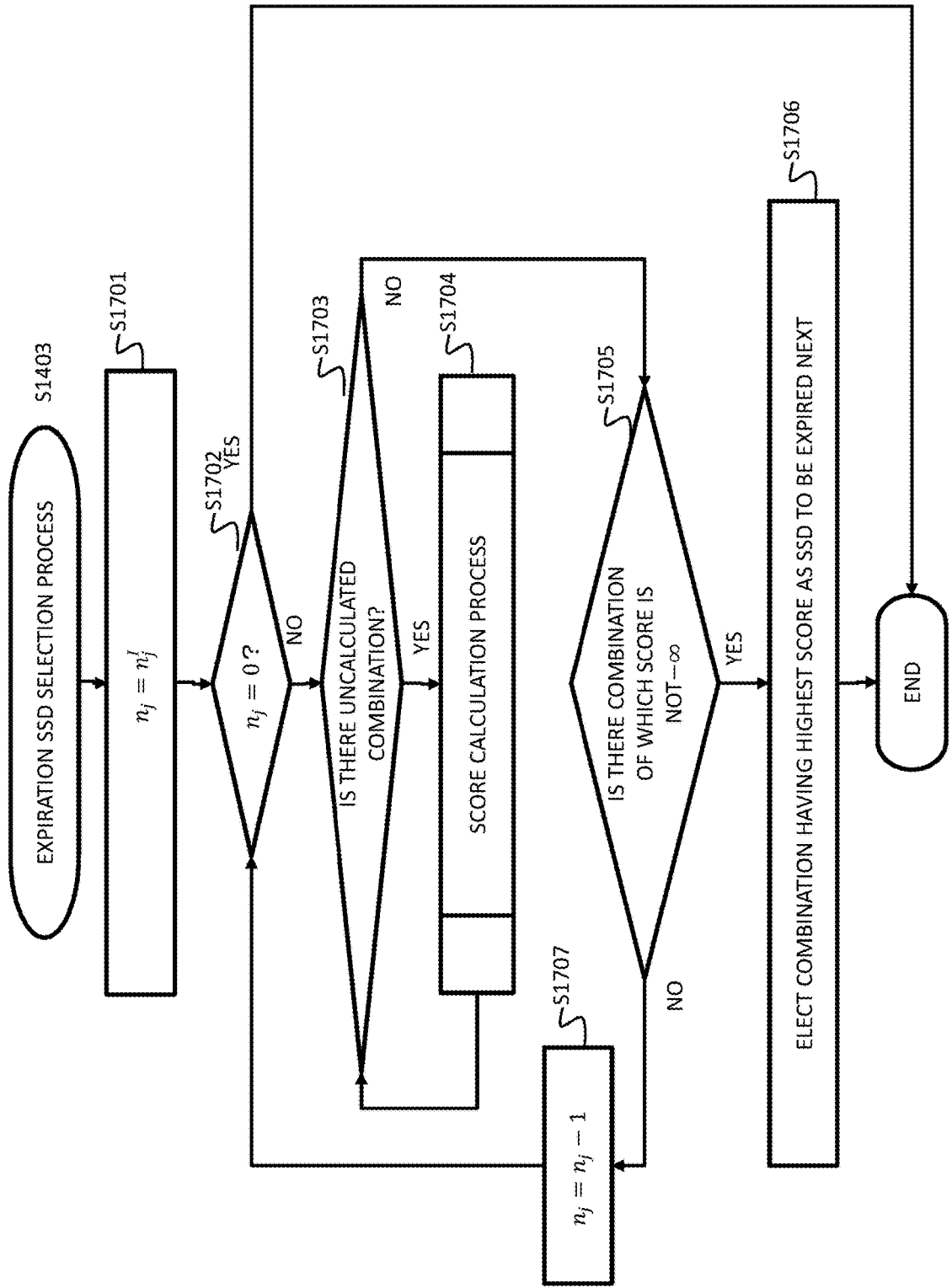
FIG. 17 is a diagram illustrating an example of a selection process for an SSD to be expired according to the embodiment.

FIG. 17 is a flowchart illustrating details of the selection process (step S1403 in FIG. 14) for the SSDs to be expired executed by the expiration plan proposal processing unit 321 of the management server 300.

In step S1701, the number ($n_j$) of SSDs to be expired next is set as an ideal value of the number of SSDs to be expired next obtained in step S1402. In a case where the number of devices to be swapped is input by the user, the value is used.

In step S1702, in a case where the number ($n_j$) of SSDs to be expired next is "0", the process ends, and in a case where the number is other than "0", the process proceeds to step S1703.

In order to determine the SSD to be expired from among the SSDs in the pool, the score is calculated for each SSD combination configured with the number ($n_j$) of SSDs to be expired next. This is because the combination of SSDs with the highest score is selected as the set of SSDs to be expired next.

In step S1703, it is determined whether there is an unprocessed SSD combination. If there is an unprocessed SSD combination, the score is calculated for the unprocessed SSD combination (S1704). The calculation of the score will be described with reference to FIG. 18. If there is no unprocessed combination, the process proceeds to step S1705.

In step S1705, it is determined whether there is a combination of which score is not minus infinity ($-\infty$). If there is a combination of which score is not $-\infty$, the combination with the highest score is selected as a set of SSDs to be expired next in step S1706.

If there is no combination of which score is not $-\infty$, the process from step S1702 is executed with the number obtained by subtracting "1" from the number of SSDs to be expired next.

By this process, it is possible to select the combination having the highest score among the combinations of the numbers of SSDs to be expired from the SSDs in the pool as the SSD to be expired next.

FIG. 18 illustrates the calculation of the score in step S1704 in FIG. 17. That is, the figure illustrates an example of extracting the SSDs corresponding to the number of SSDs ($n_j$) to be expired next from the pool and obtaining the score for determining the combination of SSDs to be expired next from the combination of the extracted SSDs.

For example, the score is obtained by (Formula 1). The definitions of the terminology and variables in (Formula 1) are as illustrated in FIG. 18.

The first term related to the coefficient "a" in (Formula 1) is a variable related to the lifetime of the target SSD. If the SSD has an insufficient remaining lifetime, the value of the score (S) increases. Conversely, if the remaining lifetime of the target SSD is long, the score (S) becomes small. That is, a combination of SSDs having an insufficient lifetime has a high score and is selected as the SSDs to be expired next in step S1706.

A value obtained by subtracting the average of the writing frequencies of the entire pool from the ideal writing frequency of the i-th SSD can be used as the first term related to the coefficient "a" in (Formula 1). The ideal writing frequency of the SSD is a writing frequency at which the SSD will reach the end of the lifetime (expire) at the swapping time.

The term related to the coefficient "b" in (Formula 1) becomes a variable related to the value set as the consumption SSD prioritized policy in the user policy table 101a. This term has a larger score (S) value as the term matches with the user policy, and this term has a smaller score (S) value as the term does not match with the user policy. That is, as the term matches with the user policy, the SSD is selected as the SSD to be expired.

As values considered as the coefficient "b" in (Formula 1), for example, as illustrated in the table below in FIG. 18, a performance prioritized coefficient and a cost prioritized coefficient for single-level cell (SLC), double-level cell (DLC), triple-level cell (TLC), and quad-level cell (QLC) as the types of the flash memories constituting the SSD are used. Furthermore, these numbers may be other values as long as the SSD that matches with the consumption SSD prioritized policy requested by the user can be selected.

Furthermore, by appropriately selecting the values of the coefficients "a" and "b", a lifetime-emphasized score, a characteristic-emphasized score, an only-lifetime-considered score, and an only-performance-considered score can be freely set. In addition, the term related to the coefficient "a" is mainly suitable for the evaluation after the stable operation, and the term related to the coefficient "b" is mainly suitable for the evaluation immediately after the start of the operation.

The calculation of the score may be calculated by another formula obtained by considering the lifetime and characteristics of the SSD.

Figure 19:
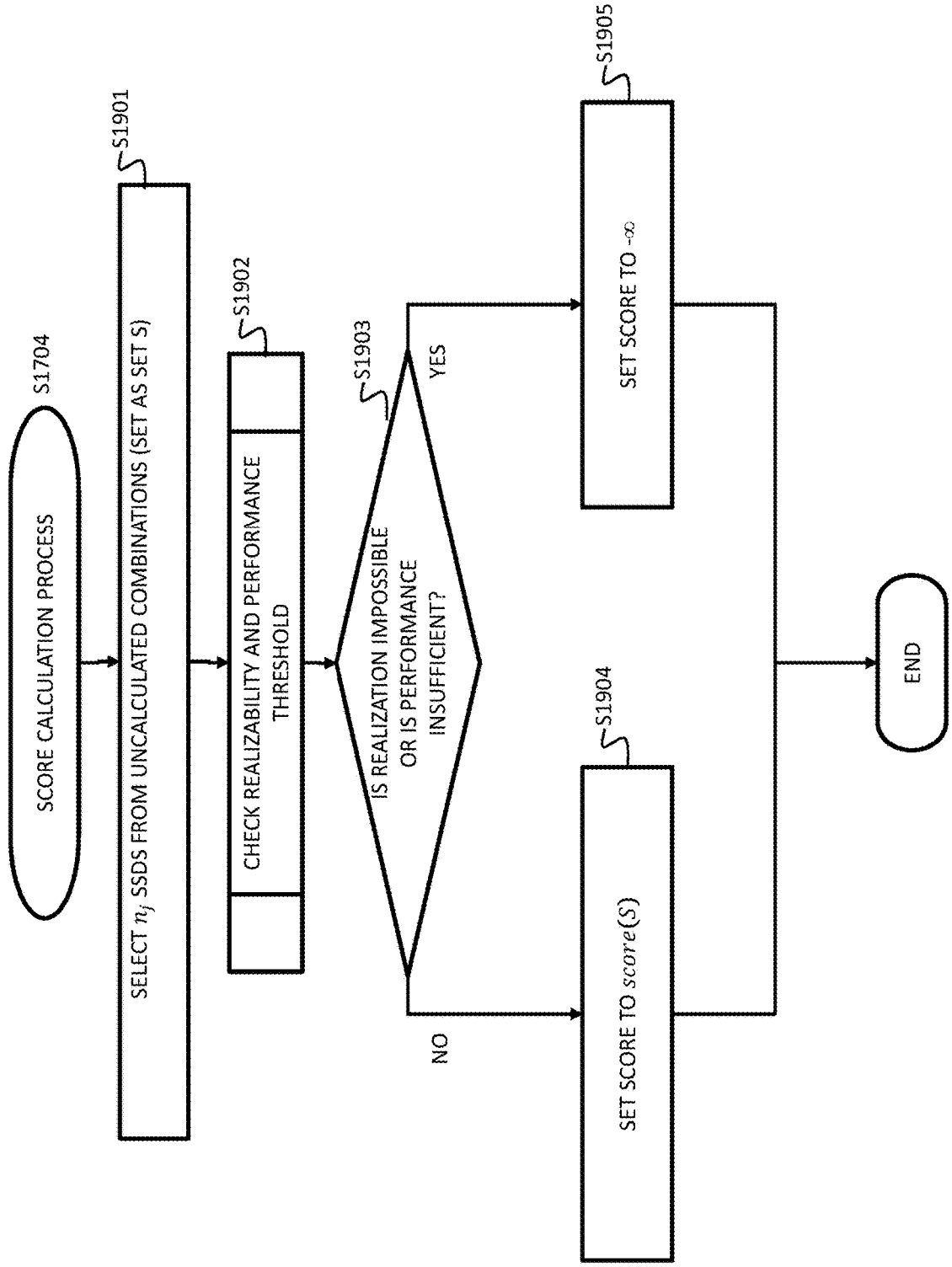
FIG. 19 is a flowchart illustrating in detail an example of a score calculation process according to the embodiment.

FIG. 19 is a flowchart illustrating details of a score calculation process (step S1704 of the expiration SSD selection process) executed by the expiration plan proposal processing unit 321 of the management server 300.

In step S1901, the SSD to be expired next is selected from the uncalculated combinations. Next, in step S1902, check of the realizability is performed. The contents of the check of the realizability will be described with reference to FIG. 20.

In a case where realization is impossible or performance is insufficient in step S1903, the score is set to $-\infty$ (S1905). If realization is not impossible or performance is not insufficient, the calculated score is employed.

Figure 20:
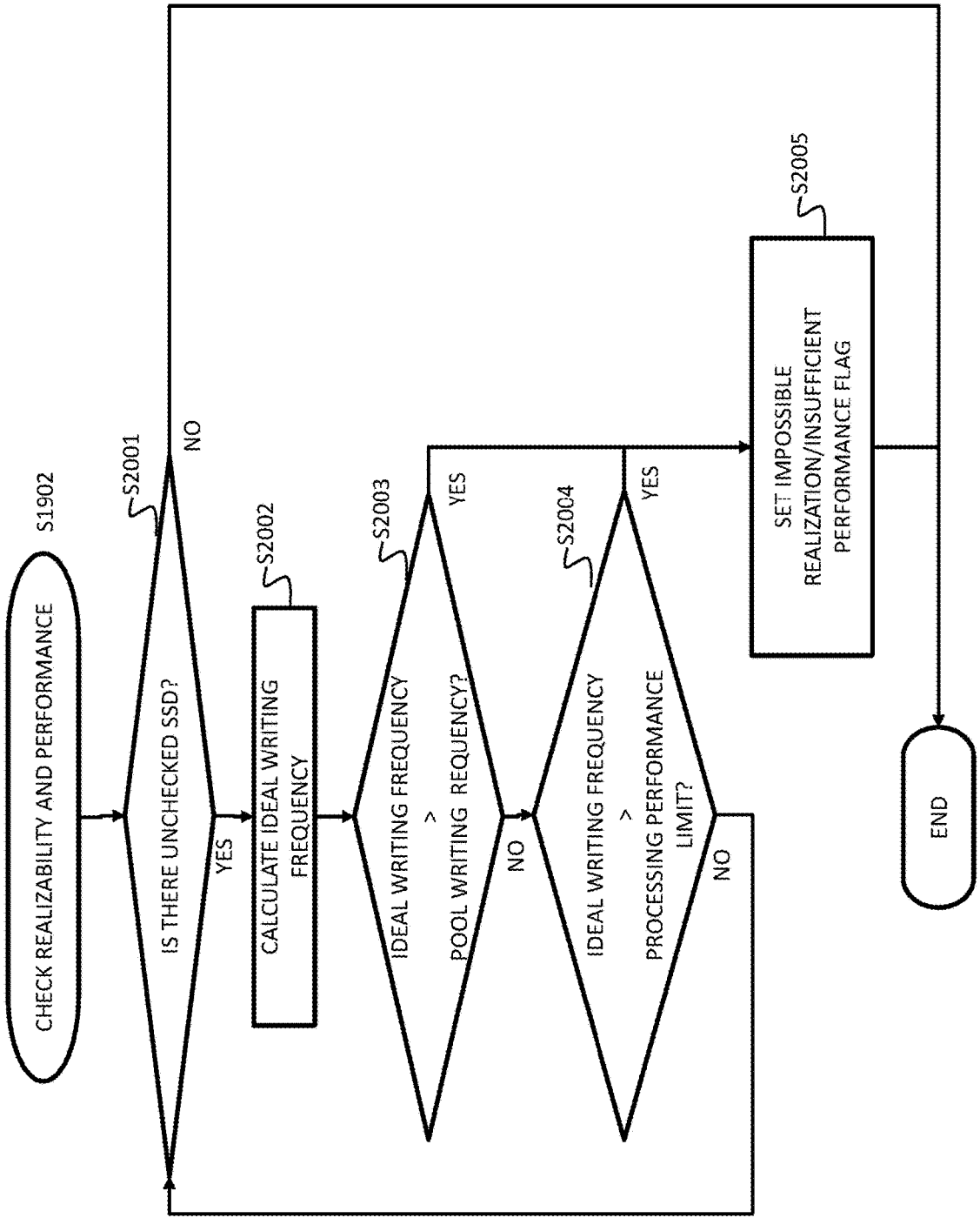
FIG. 20 is a flowchart illustrating an example of details of check of realizability and performance according to the embodiment.

FIG. 20 is a flowchart illustrating an example of details of check of the realizability and performance S1902 executed by the expiration plan proposal processing unit 321 of the management server 300.

In step S2001, it is determined whether there is an unchecked SSD. If there is an unchecked SSD, the process proceeds to step S2002, and if there is no unchecked SSD, the process ends.

In step S2002, the ideal writing frequency is calculated. The ideal writing frequency is a writing frequency at which the SSD will reach the end of the lifetime (expires) at the swapping time and can be obtained from a value obtained by dividing the number of remaining writable times of the SSDs by a period from the current time to the next swapping time.

In a case where the ideal writing frequency is higher than the writing frequency of the entire pool in step S2003, the process proceeds to step S2005 to set an impossible realization/insufficient performance flag. This is because even a collection of the writing frequencies to be processed in the entire pool does not reach the ideal writing frequency of the target SSD to be expired.

In a case where the ideal writing frequency exceeds the processing performance limit in step S2004, the process proceeds to step S2005 to set an impossible realization/insufficient performance flag. For example, this corresponds to a case where there is no processing capability to realize the acceleration process for concentrating the writing on the target SSD to be expired.

As described above, the management server 300 selects the SSD to be swapped at the next swapping time on the basis of the remaining lifetime of the SSD and the characteristics according to the user policy and transmits an expiration plan to the controller 100. The controller 100 updates the items of the next expiration target of the each-SSD expiration plan management table 101b on the basis of the expiration plan.

<Page Rearrangement>

In order to realize the process of accelerating or decelerating the writing frequency so that the SSD to be expired will have the ideal writing frequency until the next swapping time, the data stored in the page of the SSD with the short remaining lifetime is rearranged to the page of the SSD with the long remaining lifetime.

That is, the real page allocated to the page of the virtual volume is rearranged to another real page on the basis of the writing frequency for the data stored in the page of the virtual volume. Furthermore, the data moves between SSDs in the same pool.

Figure 21:
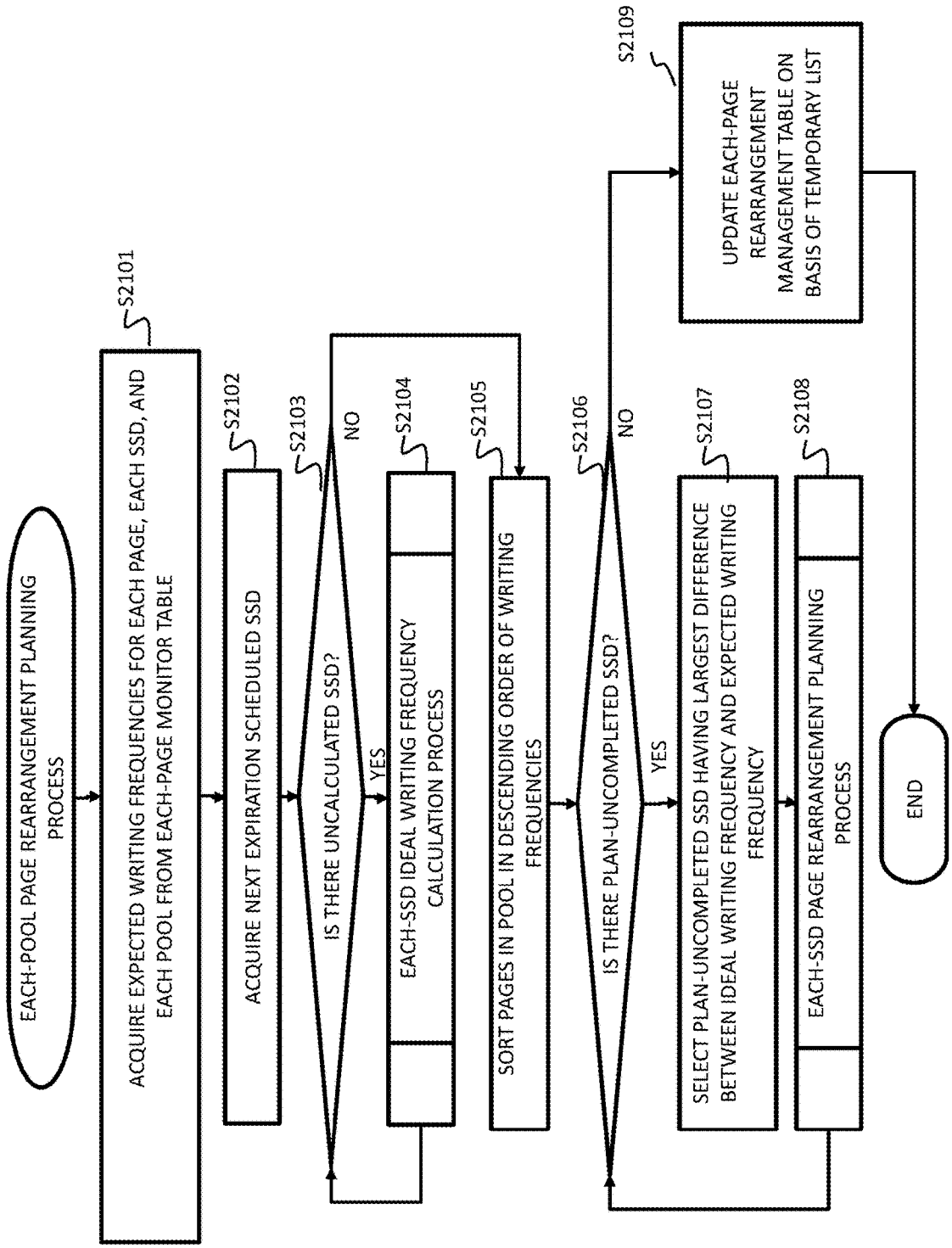
FIG. 21 is a flowchart illustrating an example of an each-pool page rearrangement planning process according to the embodiment.

FIG. 21 is a flowchart of an each-pool page rearrangement planning process executed by the rearrangement processing unit 125 of the controller 100.

In step S2101, the expected writing frequencies for each page, each SSD, and each pool of the virtual volume of the each-page monitor table 101c are acquired. The expected writing frequency denotes a writing frequency in which the future is predicted from the past writing frequency. The writing frequency for each page of the virtual volume, the writing frequency for each SSD, and the writing frequency for each pool obtained by using the configuration information from the writing frequency for each page of the virtual volume are managed by the each-page monitor table 101c. Furthermore, the writing frequency for each SSD may be obtained from the SSD and managed by the each-page monitor table 101c.

In step S2102, by referring to the next expiration target of the each-SSD expiration plan management table 101b, the next expiration scheduled SSD is acquired.

In step S2103, it is determined whether there is an uncalculated SSD. If there is an uncalculated SSD, the process proceeds to step S2104, and if there is no uncalculated SSD, the process proceeds to step S2105.

In step S2014, the each-SSD ideal writing frequency calculation process is executed. This process will be described with reference to FIG. 22.

In step S2105, the pages in the pool are sorted in descending order of the writing frequencies.

In step S2106, it is determined whether there is a plan-uncompleted SSD. If there is a plan-uncompleted SSD, the process proceeds to step S2107, and if there is no plan-uncompleted SSD, the process proceeds to step S2109. In step S2109, the each-page rearrangement management table is updated on the basis of a temporary list.

In step S2107, a plan-uncompleted SSD having the largest difference between the ideal writing frequency and the expected writing frequency is selected.

In step S2108, the page rearrangement planning process of the SSD selected in step S2107 is executed. This process will be described with reference to FIG. 23.

Figure 22:
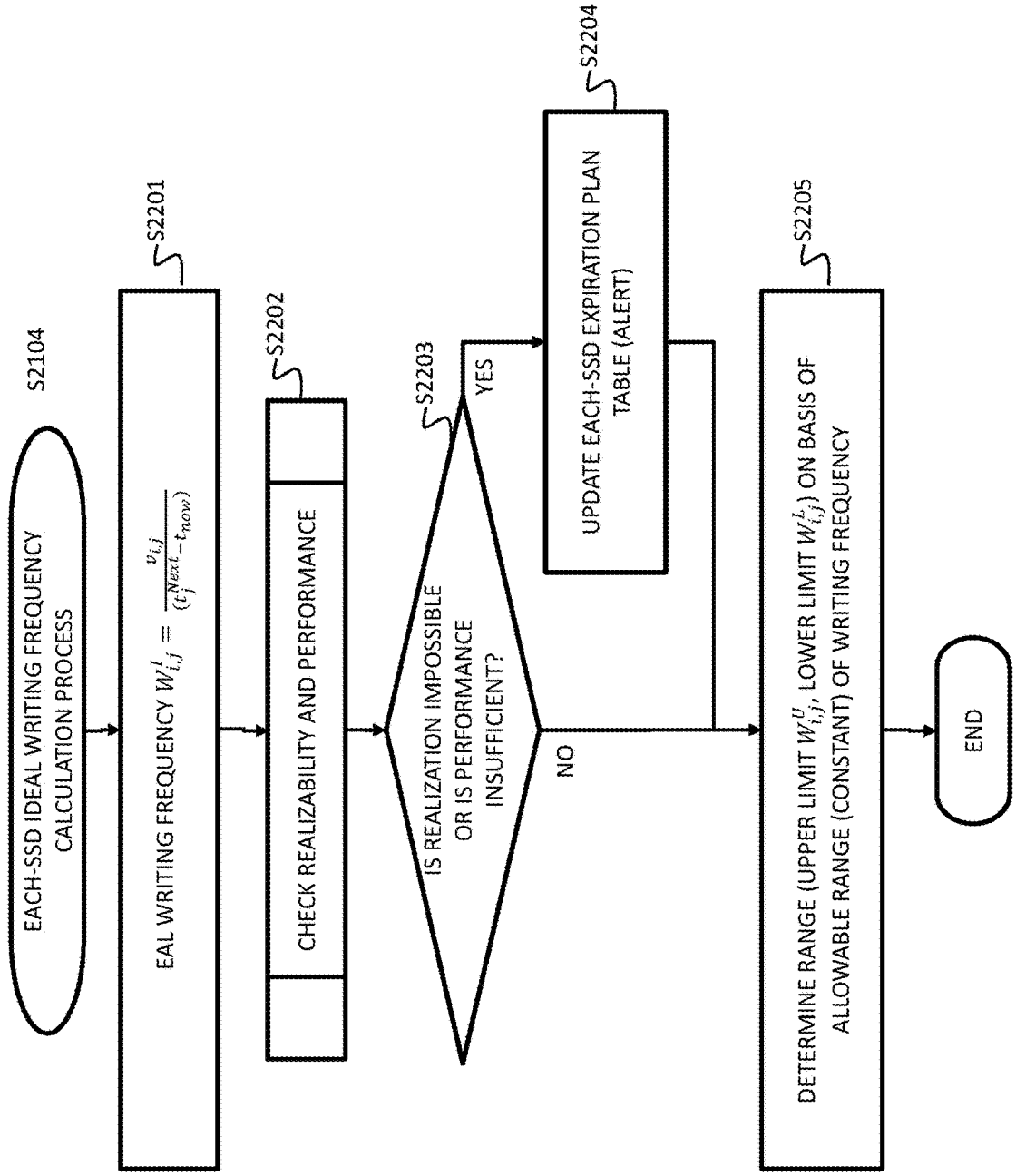
FIG. 22 is a flowchart illustrating an example of an each-SSD ideal writing frequency calculation process according to the embodiment.

FIG. 22 is a flowchart of the each-SSD ideal writing frequency calculation process executed by the ideal writing frequency update processing unit 124 of the controller 100.

In step S2201, the ideal writing frequency is calculated. The ideal writing frequency is a writing frequency at which the SSD reaches (expires) the end of the lifetime at the swapping time. For example, the ideal writing frequency can be calculated by dividing the number of remaining writable times of the SSD by the period from the current time to the next swapping time.

In step S2202, the realizability is checked. In a case where there is no realizability (impossible realization or insufficient performance), the excessive lifetime alert and the insufficient lifetime alert of the each-SSD expiration plan management table 101b are updated (S2204).

In a case where there is a realizability, in step S2205, the range (upper limit $W^U$, lower limit $W^L$) is determined on the basis of the allowable range (constant) of the writing frequency.

Figure 23:
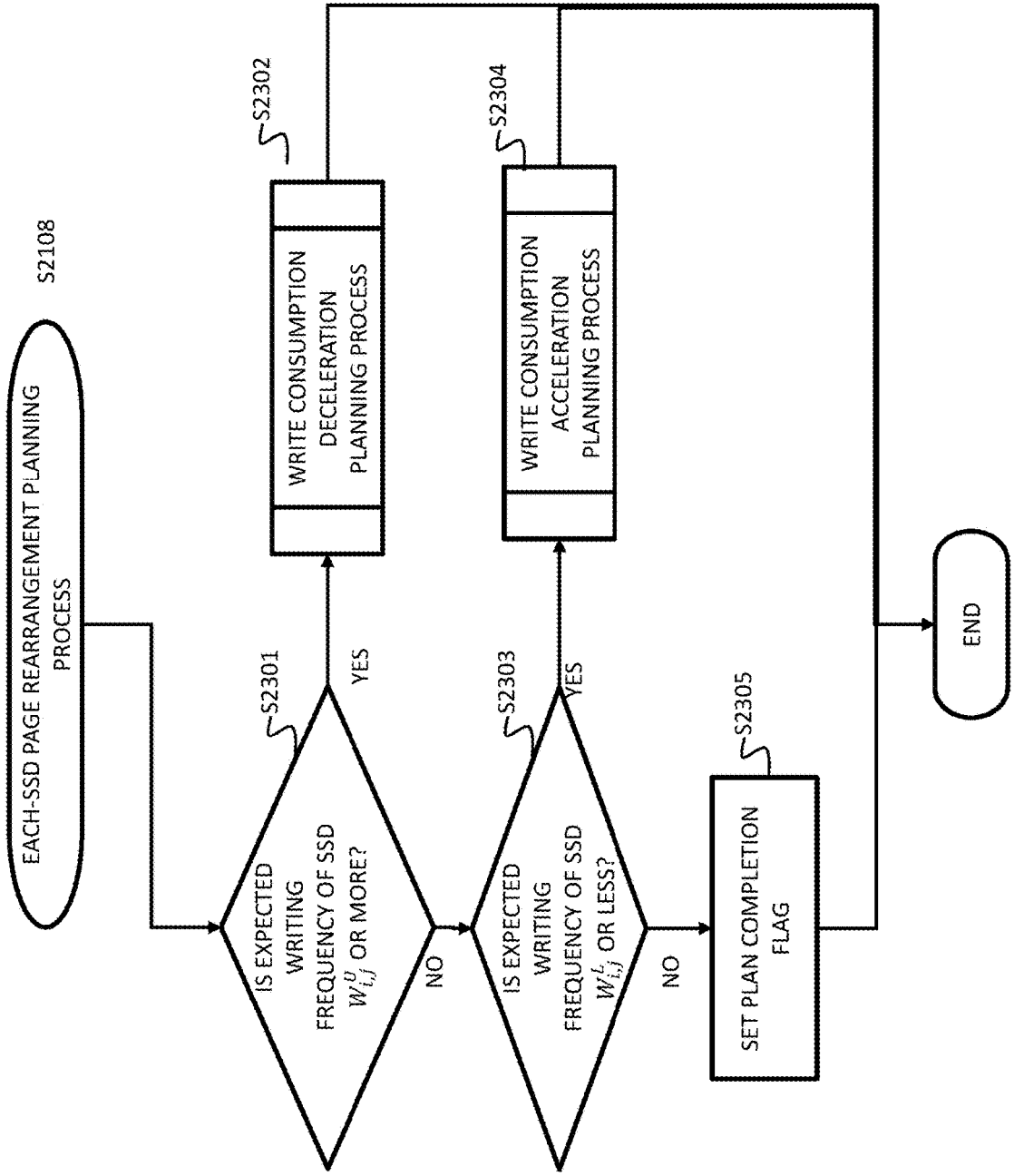
FIG. 23 is a flowchart illustrating an example of an each-SSD page rearrangement planning process according to the embodiment.

FIG. 23 is a flowchart of an each-SSD page rearrangement planning process executed by the rearrangement processing unit 125 of the controller 100.

In step S2301, it is determined whether the expected writing frequency of the SSD is the upper limit $W^U$ or more. In a case where the expected writing frequency is the upper limit or more, a write consumption deceleration planning process (deceleration process) for decreasing the writing frequency is executed for the SSD in step S2302. On the other hand, in a case where the expected writing frequency is the lower limit $W^L$ or less, a write consumption acceleration planning process (acceleration process) for increasing the writing frequency is executed for the SSD (S2304).

Furthermore, in a case where the writing frequency is high, the data of the SSD is rearranged from the SSD with high writing frequency to another SSD in the pool until the writing frequency is the upper limit or less, and at the same time, the data of another SSD is rearranged from the SSD with low writing frequency to the SSD. However, if the adjustment cannot be completed, a flag of insufficient lifetime is set, and the process ends at that point.

In addition, in a case where the writing frequency is low, the data of another SSD in the pool is rearranged from the SSD with the highest writing frequency to the SSD until the writing frequency becomes the lower limit or more, and at the same time, the data of the SSD is rearranged from the SSD with low writing frequency to another SSD in the pool. However, if the adjustment cannot be completed, a flag of excessive lifetime is set, and the process ends at that point.

If a flag of insufficient lifetime or a flag of excessive lifetime is displayed so as to notify the user, it is possible to propose policy resetting, relocation, or extension.

If the writing frequency is between the upper limit and the lower limit, it is not necessary to increase or decrease the writing frequency for the target SSD, and a plan completion flag is set (S2305).

Figure 24:
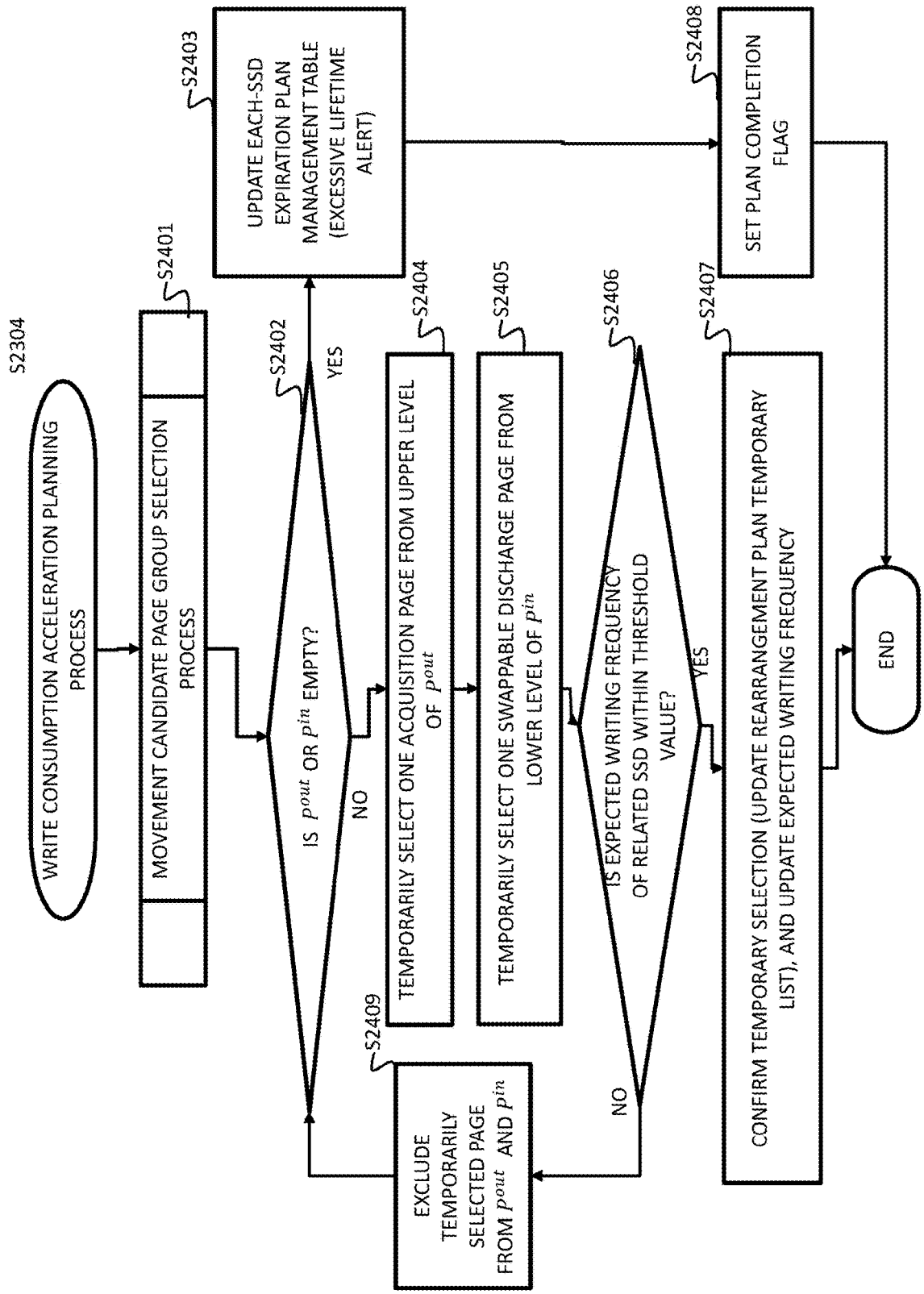
FIG. 24 is a flowchart illustrating an example of a write consumption acceleration planning process according to the embodiment.

FIG. 24 is a flowchart of the write consumption acceleration planning process (acceleration process) executed by the rearrangement processing unit 125 of the controller 100.

In step S2401, a movement candidate page group selection process for executing data rearrangement is executed. Details of this process will be described with reference to FIG. 26.

In step S2402, it is determined whether the pages selected as the movement candidate page group include the acquisition candidate page group $P^{out}$ and the discharge candidate page group $P^{in}$. Furthermore, the acquisition candidate page group $P^{out}$ is a page that does not include data in the SSD and is not yet registered in a rearrangement plan temporary list. The acquisition candidate page group $P^{out}$ acquires data stored in the pages of other SSDs. Furthermore, the discharge candidate page group $P^{in}$ is a page that includes data in the SSD and is not yet registered in the rearrangement plan temporary list. The discharge candidate page group $P^{in}$ discharges the data of the SSD to another SSD.

If there is an acquisition candidate page group $P^{out}$ or a discharge candidate page group $P^{in}$, one acquisition page is selected from the higher rank of the acquisition candidate page group $P^{out}$ in step S2404.

In step S2405, one swappable discharge page is temporarily selected from the discharge candidate page group $P^{in}$.

In step S2406, it is determined whether the expected writing frequency of the related SSD is within a threshold value. In a case where the expected writing frequency is within the threshold value, the process proceeds to step S2407 to confirm temporary selection (update the rearrangement plan temporary list), and the expected writing frequency is updated.

Furthermore, if there is no acquisition candidate page group $P^{out}$ or discharge candidate page group $P^{in}$ in step S2402, the process proceeds to step S2403, the each-SSD expiration plan management table is updated, and a plan completion flag is set in step S2408.

In addition, in a case where the expected writing frequency of the related SSD is not within the threshold value in step S2406, the temporarily selected page is excluded from the acquisition candidate page group $P^{out}$ or the discharge candidate page group $P^{in}$, and the process returns to step S2402.

Figure 25:
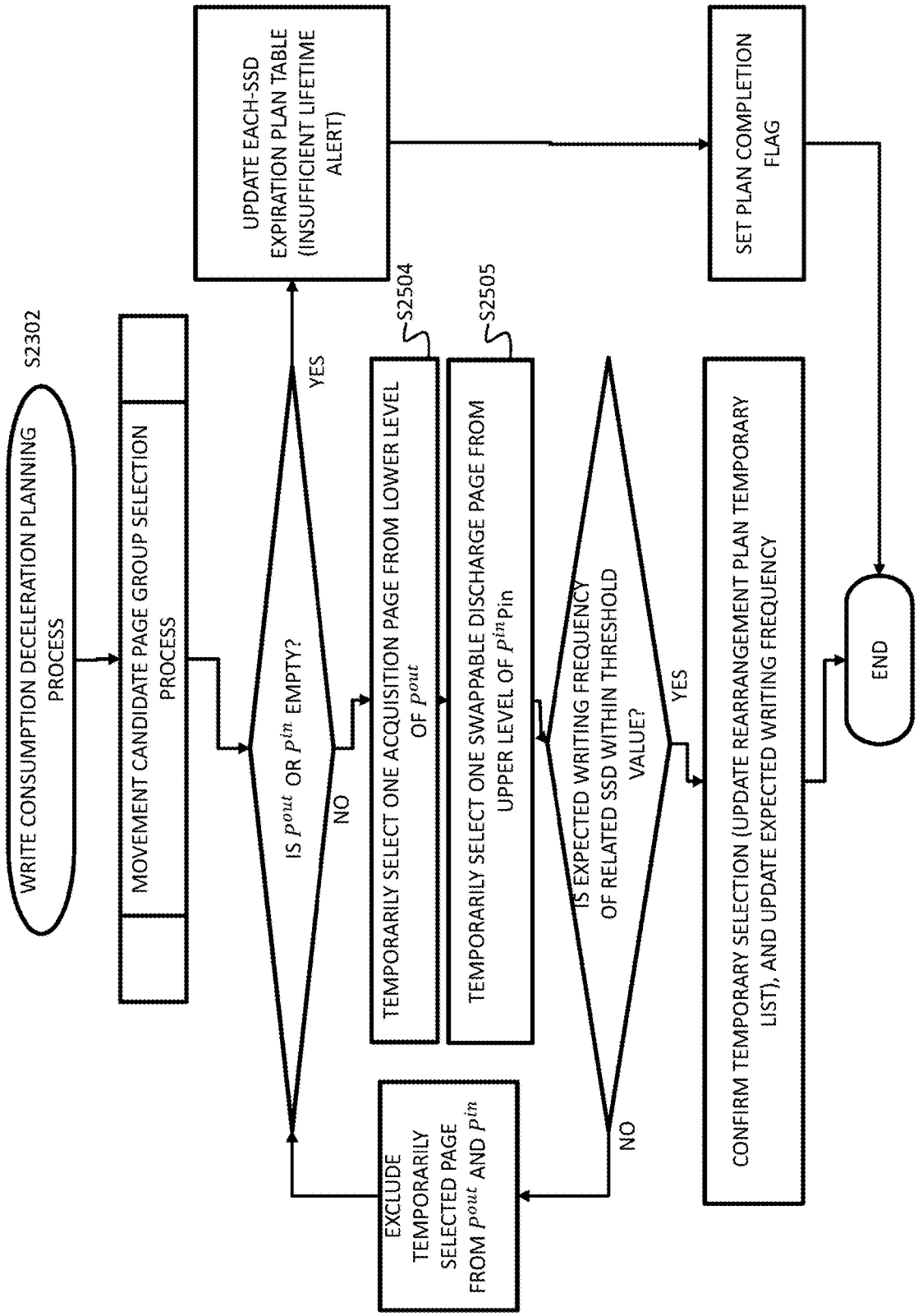
FIG. 25 is a flowchart illustrating an example of a write consumption deceleration planning process according to the embodiment.

FIG. 25 is a flowchart of the write consumption deceleration planning process (deceleration process) executed by the rearrangement processing unit 125 of the controller 100. Description of the portions common to those in FIG. 24 will be omitted. Steps S2404 and S2405 of the flowchart of the write consumption acceleration planning process of FIG. 24 are changed to steps S2504 and S2505, respectively. This is because the data movement in the data rearrangement is reversed.

Figure 26:
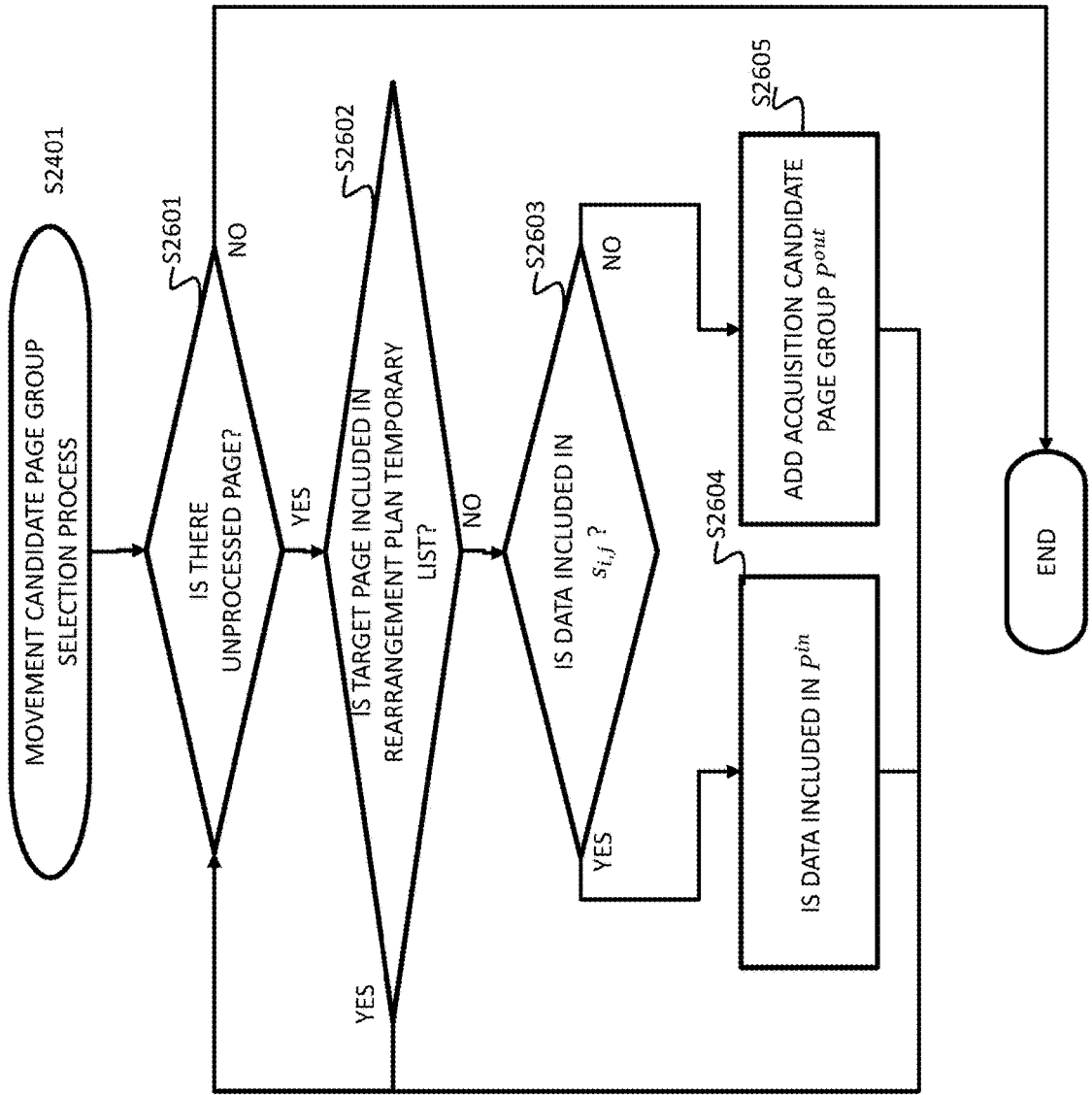
FIG. 26 is a flowchart illustrating an example of a movement candidate page group selection process according to the embodiment.

FIG. 26 is a flowchart illustrating the movement candidate page group selection process of FIGS. 24 and 25 executed by the rearrangement processing unit 125 of the controller 100.

In step S2601, it is determined whether there is an unprocessed page. If there is no unprocessed page, the process ends.

In step S2602, it is determined whether the target page is included in the rearrangement plan temporary list. If the target page is included, the process returns to step S2601. If the target page is not included, it is determined in step S2603 whether data is included in the target page (Si, j). If the data is included, the data is added to the discharge candidate page group $P^{in}$ (S2604). If the data is not included, the data is added to the acquisition candidate page group $P^{out}$ (S2605).

In this manner, the acquisition candidate page group $P^{out}$ that acquires the data of a certain SSD and the discharge candidate page group $P^{in}$ that discharges the data stored in the page of a certain SSD to another SSD are managed as a list.

If the write consumption acceleration planning process (acceleration process) of FIG. 24 is executed, a data B01 of the drive 2 is acquired into the drive 1 which is the acceleration target of FIG. 10, and the writing frequency of the drive 1 is allowed to increase. In this case, a data C02 of the drive 1 is one of the acquisition candidate pages $P^{out}$, and the data B01 of the drive 2 is one of the discharge candidate page group $P^{in}$.

On the other hand, if the write consumption deceleration planning process (deceleration process) of FIG. 25 is executed, the data F03 of the drive 4 that is the deceleration target of FIG. 10 is discharged to the drive 5, and the rearrangement of pages storing the data with high writing frequency is executed.

Figure 27:
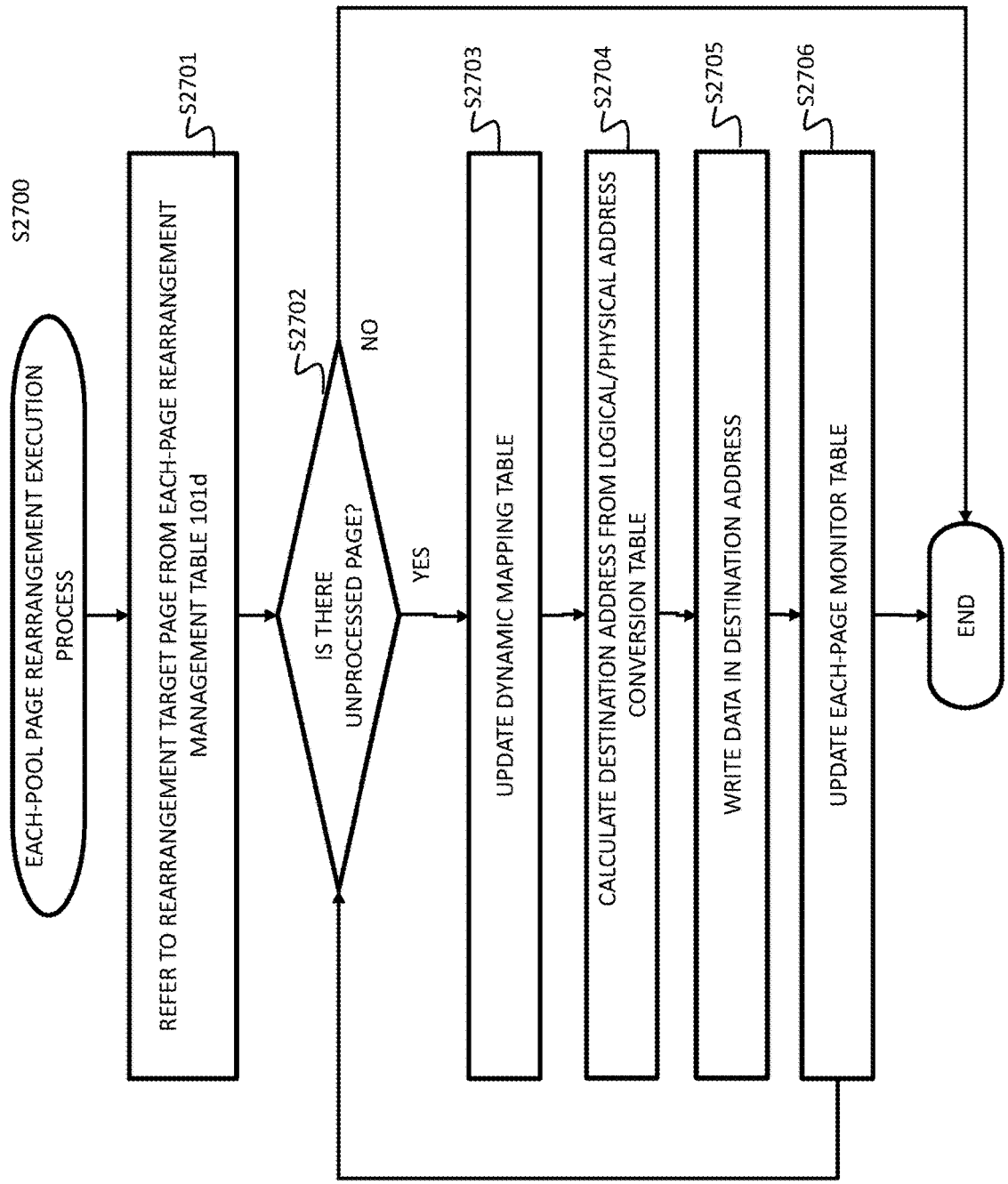
FIG. 27 is a flowchart illustrating an example of an each-pool page rearrangement execution process according to the embodiment.

FIG. 27 is a flowchart illustrating an each-pool page rearrangement execution process executed by the rearrangement processing unit 125 of the controller 100.

In step S2701, the rearrangement target page is referred to from the each-page rearrangement management table 101d. In this step, all the pages registered in the each-page rearrangement management table 101d are set as the processing targets.

In step S2702, it is determined whether there is an unprocessed page. If there is no unprocessed page, the process ends.

If there is an unprocessed page, the dynamic mapping table 101e is updated in step S2703. Next, the destination address is calculated from the logical/physical address conversion table 101f (S2704).

In step S2705, data is written in the calculated destination address and the each-page monitor table is updated (S2706).

In this manner, by rearranging the data, the each-page monitor table is updated in order to manage the configuration information of the dynamic mapping table or the like and the writing frequency.

<Writing Process>

Figure 28:
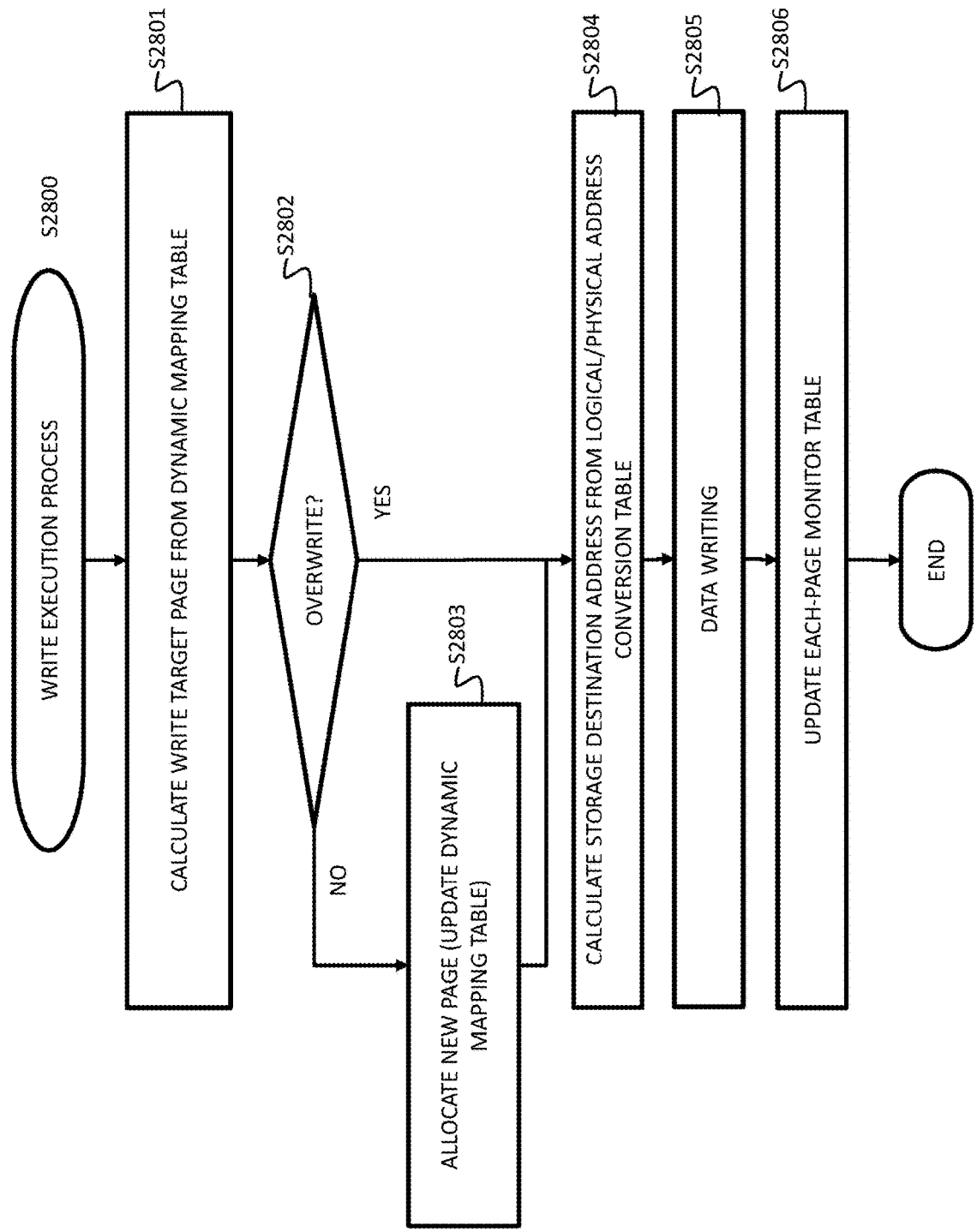
FIG. 28 is a flowchart illustrating an example of a writing process according to the embodiment.

FIG. 28 is a flowchart illustrating the writing process executed by the host I/O processing unit 121 of the controller 100.

When the writing request for the virtual logical volume 302 from the host computer 400 is received, the controller 100 calculates the write target page on the basis of the dynamic mapping table 101e (S2801).

It is determined whether the received writing request is an overwrite (S2802), and if the received writing request is an overwrite, the storage destination address is calculated from the logical/physical address conversion table 101f (S2804). Data is written to the storage destination address (S2805), and the each-page monitor table is updated (S2806).

On the other hand, if the received writing request is not an overwrite, a new real page is allocated to the page of the virtual volume, and the dynamic mapping table 101e is updated (S2803).

In this manner, the writing frequency is managed for each writing request from the host computer 400, for each real page (page of a pool or page of an SSD), for each SSD, and for each pool.

As described above, according to the embodiment, by controlling the number of times of writing to the SSD, it is possible to control the lifetime of the SSD, and it is possible to enable addition or swapping of the SSD at a swapping time desired by a user after a predetermined number of drives have been used up.

In addition, the selection of SSD (the selection of SSD to be expired) for controlling the number of times of writing to the SSD can be determined on the basis of the lifetime and characteristics of the SSD.

In addition, writing of the selected SSD can be controlled by selecting the SSD to be swapped at the swapping time and rearranging the data of the SSD.

In addition, in a case where the SSD that is to reach the end of the lifetime cannot be selected at the swapping time input by the user, it is possible to propose to input another swapping time to the user.

In addition, in order to swap the appropriate number of SSDs at the swapping time input by the user, it is possible to propose the number of SSDs to be swapped to the user.

Furthermore, by controlling the number of times of writing to the SSD included in the drive box, it is possible to control the lifetime of the SSD in the drive box, and it is possible to enable addition or swapping of the drive box at the swapping time desired by the user or after the predetermined number of drives have been used up.

Furthermore, the present invention is not limited to the above-described embodiments, but various modifications are included. In addition, the above-described embodiments have been described in detail in order to describe the present invention in an easy-to-understand manner, and thus, the present invention is not necessarily limited to those having all the configurations described. In addition, a portion of the configuration of a certain embodiment can be swapped with the configuration of another embodiment, and the configuration of another embodiment can be added to the configuration of a certain embodiment. In addition, with respect to a portion of the configuration of each embodiment, other configurations can be added, deleted, and/or swapped. In addition, each of the above-described configurations, functions, processing units, processing means, and the like may be realized in hardware by designing a portion or all of the configurations, functions, processing units, processing means, and the like with, for example, an integrated circuit. In addition, each of the above-described configurations, functions, and the like may be realized by software by allowing a processor to interpret and execute a program that realizes each function.

What is claimed is:

1. A storage system having a management server, a drive box including a plurality of SSDs, and a controller which performs control of receiving an I/O request from a host computer and reading data from or writing data in the SSD in the drive box,
    wherein the management server selects the SSD to be swapped on the basis of a lifetime at a swapping time of the SSD in the drive box, and
    wherein the controller controls a writing frequency for the selected SSD so that the selected SSD is controlled to reach the end of the lifetime at the swapping time,
    wherein the management server selects the SSD to be swapped at the swapping time of the SSD in the drive box on the basis of the lifetime of the SSD and characteristics of the SSD,
    wherein the controller:
    forms a pool by using a plurality of the SSDs included in the drive box,
    provides the host computer with a virtual volume having a plurality of first pages, and
    stores a write data by allocating second pages constituting the pool to the first pages of the virtual volume in response to a writing request for the virtual volume provided to the host computer, and
    wherein the management server:
    calculates a score for each SSD combination configured with the number of SSDs to be swapped among the SSDs constituting the pool according to the lifetime and the characteristics of the SSD, and
    selects an SSD to be swapped at the swapping time on the basis of the score.

2. The storage system according to claim 1, wherein the controller
    provides the host computer with a virtual volume having a plurality of first pages, and
    controls the writing frequency for the selected SSD by rearranging the data stored in the selected SSD to another SSD on the basis of the writing frequency for the data stored in the first pages.

3. The storage system according to claim 1, wherein the management server calculates the score for each combination of SSDs configured with the number of SSDs to be swapped by using a first coefficient related to the lifetime of the SSD and a second coefficient related to the characteristics of the SSD.

4. The storage system according to claim 3, wherein the management server
    calculates an ideal writing frequency for the selected SSD that reaches the end of the lifetime at the swapping time, and
    determines that realization is impossible in a case where the ideal writing frequency is higher than the writing frequency for the pool including the selected SSD.

5. The storage system according to claim 4, wherein the management server determines that realization is impossible in a case where the ideal writing frequency exceeds a processing capability of the selected SSD.

6. The storage system according to claim 1, wherein the management server calculates a value obtained by dividing the number of SSDs to be swapped by the number of swapping opportunities as an ideal number of devices to be swapped.

7. An SSD swapping method of a storage system having a management server, a drive box including a plurality of SSDs, and a controller which performs control of receiving an I/O request from a host computer and reading a data from or writing a data in the SSD in the drive box,
    wherein the management server selects the SSD to be swapped on the basis of a lifetime at a swapping time of the SSD in the drive box,
    wherein the controller controls a writing frequency for the selected SSD so that the selected SSD is controlled to reach the end of the lifetime at the swapping time,
    wherein the controller:
    forms a pool by using a plurality of the SSDs included in the drive box,
    provides the host computer with a virtual volume having a plurality of first pages, and
    stores a write data by allocating second page configuring the pool to the first pages of the virtual volume in response to a writing request for the virtual volume, and
    wherein the management server further:
    calculates a score for each SSD combination configured with the number of SSDs to be swapped among the SSDs constituting the pool according to the lifetime and the characteristics of the SSD, and
    selects an SSD to be swapped at the swapping time on the basis of the score.

8. The SSD swapping method of a storage system according to claim 7, wherein the controller
    provides the host computer with a virtual volume having a plurality of first pages, and
    controls the writing frequency for the selected SSD by rearranging the data stored in the selected SSD to another SSD on the basis of the writing frequency for the data stored in the first pages.

9. The SSD swapping method of a storage system according to claim 7, wherein the management server
    calculates the ideal writing frequency for the selected SSD that reaches the end of the lifetime at the swapping time, and
    in a case where the ideal writing frequency is higher than the writing frequency for the pool including the selected SSD, or
    in a case where the ideal writing frequency exceeds the processing capability of the selected SSD, it is determined that realization is impossible.

* * * * *